(12) United States Patent
Parikh et al.

(10) Patent No.: US 7,478,340 B2
(45) Date of Patent: Jan. 13, 2009

(54) SYSTEMS AND METHODS FOR MANAGING PREPARATION OF GRAPHICAL ELEMENTS FOR PRESENTATION

(75) Inventors: Sujal S. Parikh, Redmond, WA (US); Dmitry Titov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 10/691,349

(22) Filed: Oct. 22, 2003

(65) Prior Publication Data

US 2005/0091605 A1    Apr. 28, 2005

(51) Int. Cl.
*G06F 3/048* (2006.01)

(52) U.S. Cl. .................. 715/788; 715/248; 715/252; 715/764; 715/765; 715/771; 345/619; 719/328

(58) Field of Classification Search ............ 715/788, 715/248, 252, 764, 765, 771, 866; 345/619; 719/328

See application file for complete search history.

(56) References Cited

U.S. PATENT DOCUMENTS

| | | | | |
|---|---|---|---|---|
| 4,800,510 A | * | 1/1989 | Vinberg et al. ............. 345/440 |
| 5,060,170 A | * | 10/1991 | Bourgeois et al. ........... 715/788 |
| 5,414,809 A | * | 5/1995 | Hogan et al. ................ 715/765 |
| 5,649,216 A | * | 7/1997 | Sieber ........................ 715/234 |
| 5,721,848 A | * | 2/1998 | Joseph ....................... 715/764 |
| 5,796,401 A | * | 8/1998 | Winer ........................ 345/619 |
| 5,838,317 A | | 11/1998 | Bolnick et al. |
| 5,886,694 A | * | 3/1999 | Breinberg et al. ........... 715/788 |
| 6,043,817 A | * | 3/2000 | Bolnick et al. .............. 715/788 |
| 6,057,842 A | * | 5/2000 | Knowlton et al. ........... 715/788 |
| 6,111,573 A | * | 8/2000 | McComb et al. ............ 715/763 |
| 6,154,220 A | | 11/2000 | Prakriya et al. |
| 6,189,019 B1 | | 2/2001 | Blumer et al. |
| 6,249,284 B1 | | 6/2001 | Bogdan |
| 6,356,279 B1 | * | 3/2002 | Halstead et al. ............. 345/619 |
| 6,381,740 B1 | | 4/2002 | Miller et al. |
| 6,624,828 B1 | | 9/2003 | Dresevic et al. |
| 6,667,750 B1 | * | 12/2003 | Halstead et al. ............. 715/788 |
| 6,791,587 B1 | * | 9/2004 | Bamford et al. ............. 715/854 |
| 7,392,483 B2 | * | 6/2008 | Wong et al. ................. 715/746 |
| 2002/0000986 A1 | * | 1/2002 | Sowizral et al. ............ 345/421 |
| 2002/0075290 A1 | | 6/2002 | Rajarajan et al. |
| 2002/0109704 A1 | | 8/2002 | Rajarajan et al. |
| 2002/0120784 A1 | | 8/2002 | Rajarajan et al. |
| 2002/0122067 A1 | * | 9/2002 | Geigel et al. ................ 345/788 |
| 2002/0191027 A1 | | 12/2002 | Morrow et al. |
| 2003/0007014 A1 | * | 1/2003 | Suppan et al. .............. 345/853 |
| 2003/0058286 A1 | * | 3/2003 | Dando ....................... 345/853 |

(Continued)

OTHER PUBLICATIONS

Computer Dictionary, 1997, Microsoft Press, Third Edition, p. 392.*

(Continued)

*Primary Examiner*—Ba Huynh
*Assistant Examiner*—John M Heffington
(74) *Attorney, Agent, or Firm*—Merchant & Gould

(57) ABSTRACT

Methods and systems are provided for managing the preparation of graphical elements in computer application programs for presentation. The methods independently identify and measure, and identify and arrange, sets of elements. A computer-readable medium is also provided for facilitating the management of the preparation for presentation of graphical elements in computer application programs.

23 Claims, 21 Drawing Sheets

U.S. PATENT DOCUMENTS

2003/0067485 A1* 4/2003 Wong et al. .................. 345/747
2003/0076322 A1 4/2003 Ouzts et al.
2003/0079177 A1 4/2003 Brintzenhofe et al.
2003/0084181 A1 5/2003 Wilt
2004/0268269 A1* 12/2004 Breinberg ................... 715/851

OTHER PUBLICATIONS

U.S. Appl. No. 10/692,200, filed Oct. 23, 2003, Parikh et al.
Official Action for U.S. Appl. No. 10/692,200 dated Jan. 30, 2007.
Official Action for U.S. Appl. No. 10/692,200 dated Jun. 23, 2008.

* cited by examiner

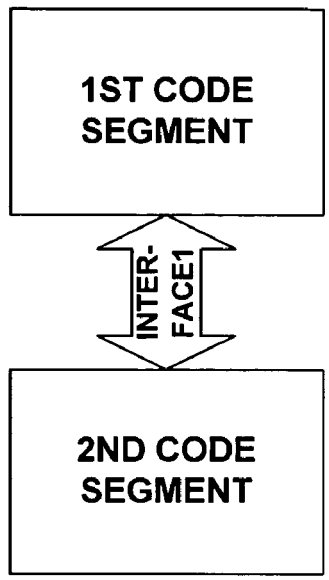
FIGURE A1
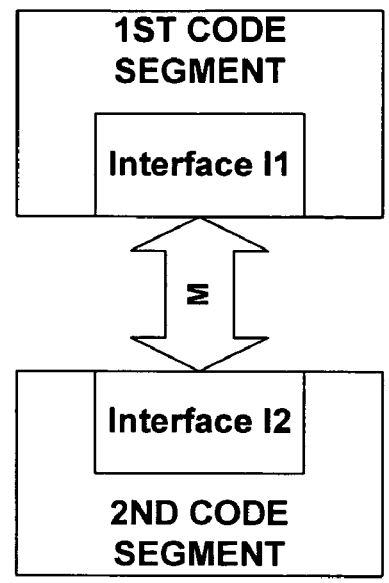
FIGURE A2
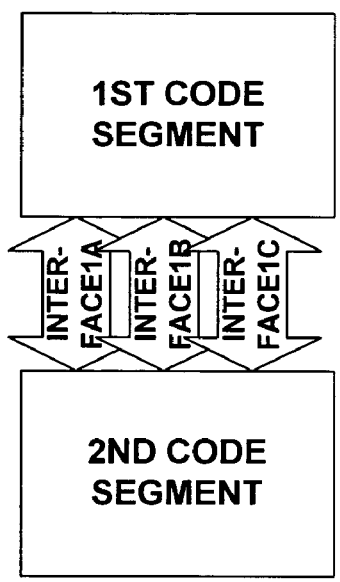
FIGURE B1
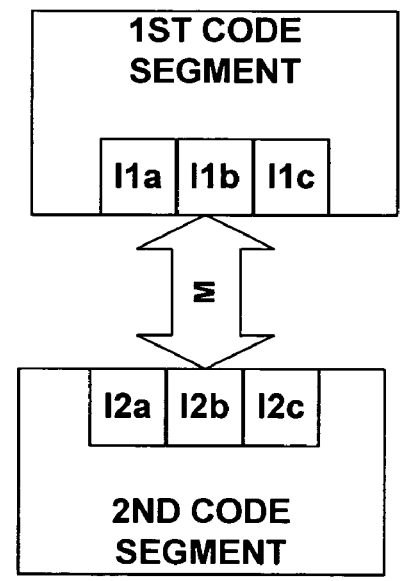
FIGURE B2

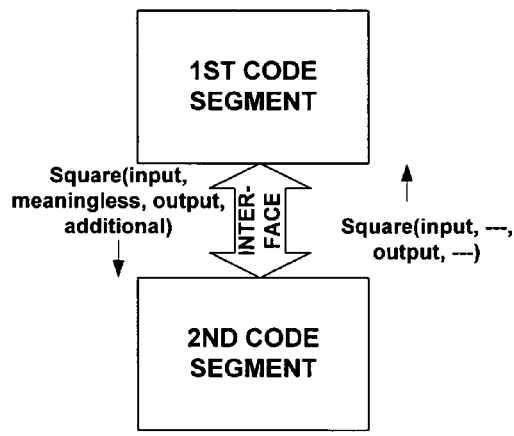
FIGURE C1
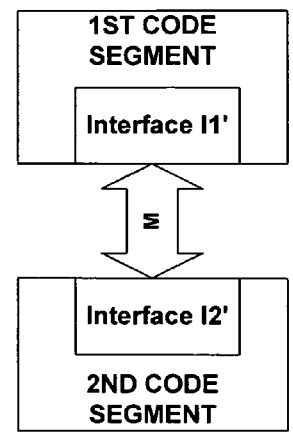
FIGURE C2
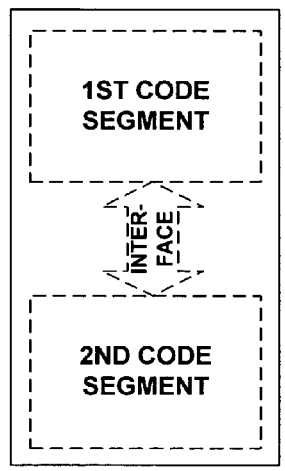
FIGURE D1
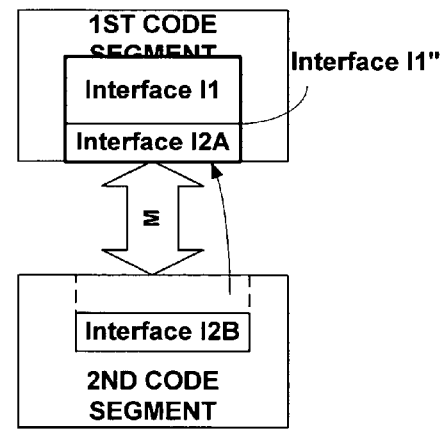
FIGURE D2

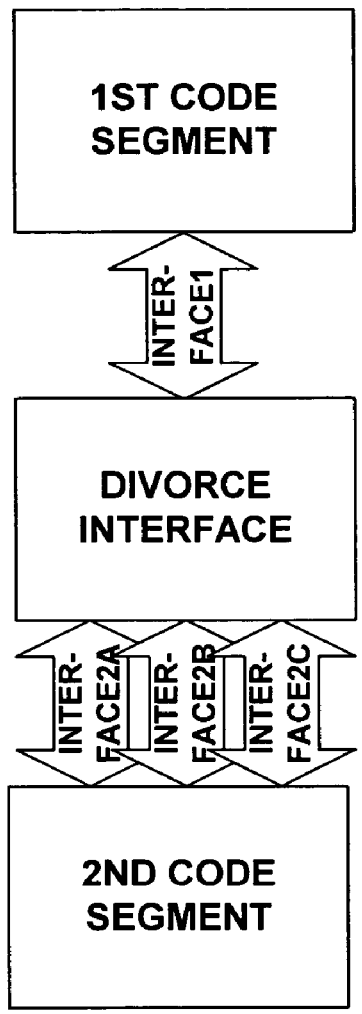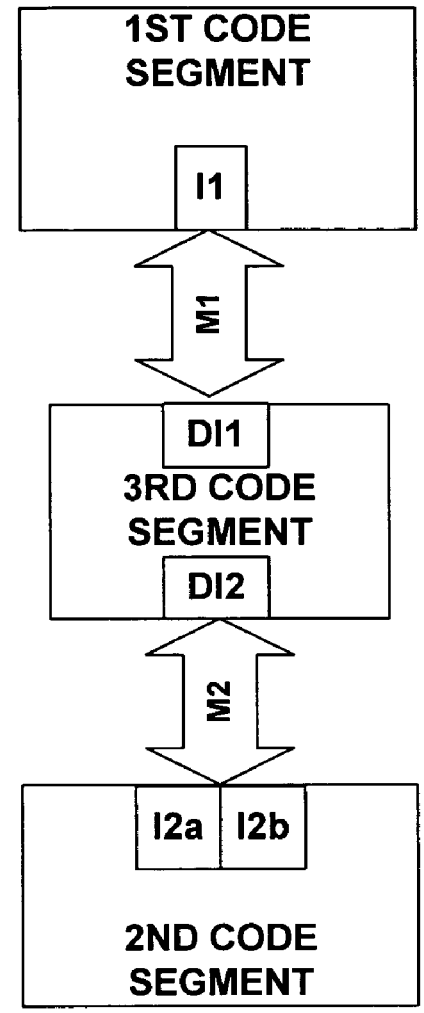
FIGURE E1　　　　　　　　　FIGURE E2

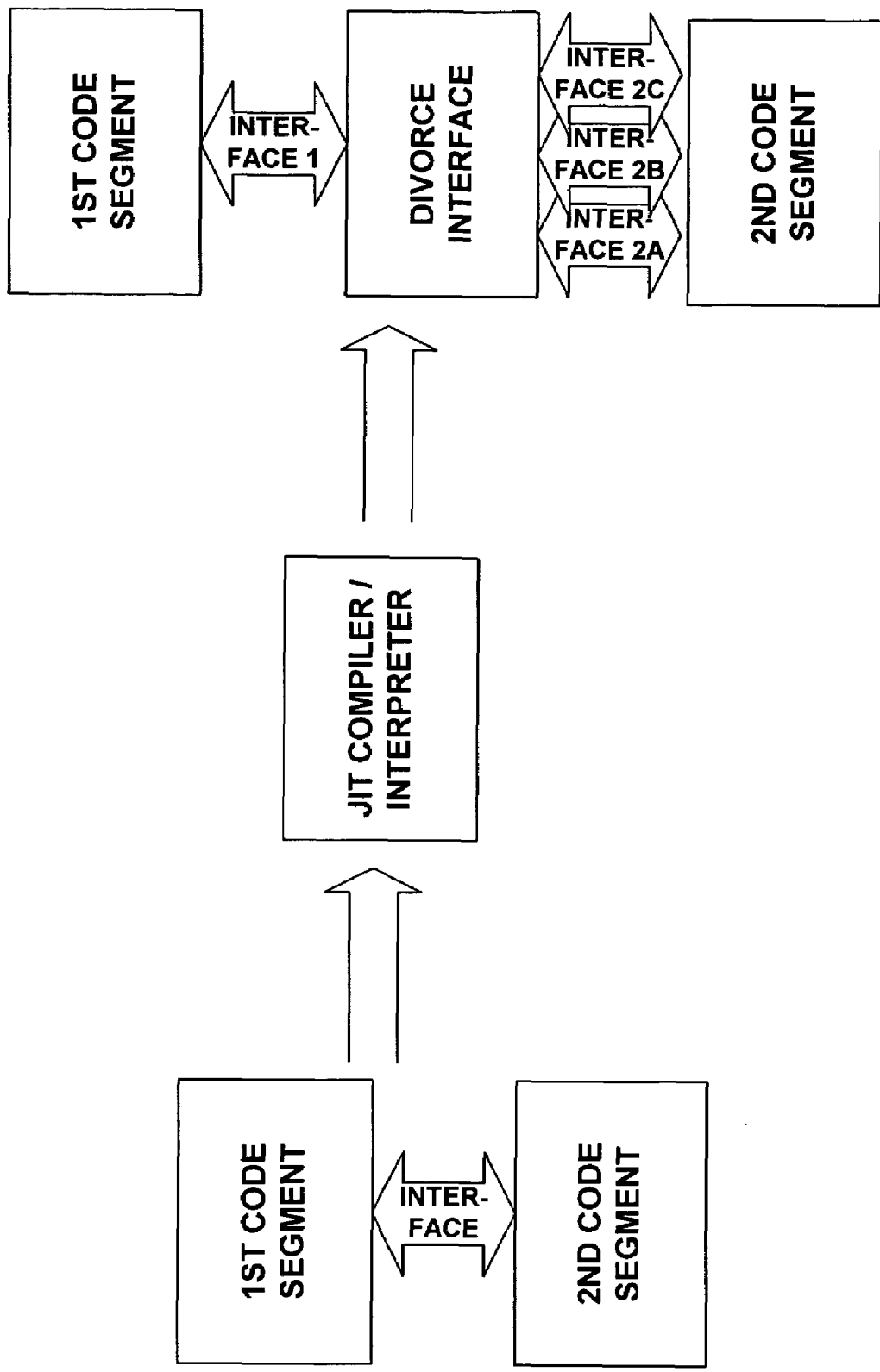
FIGURE F1

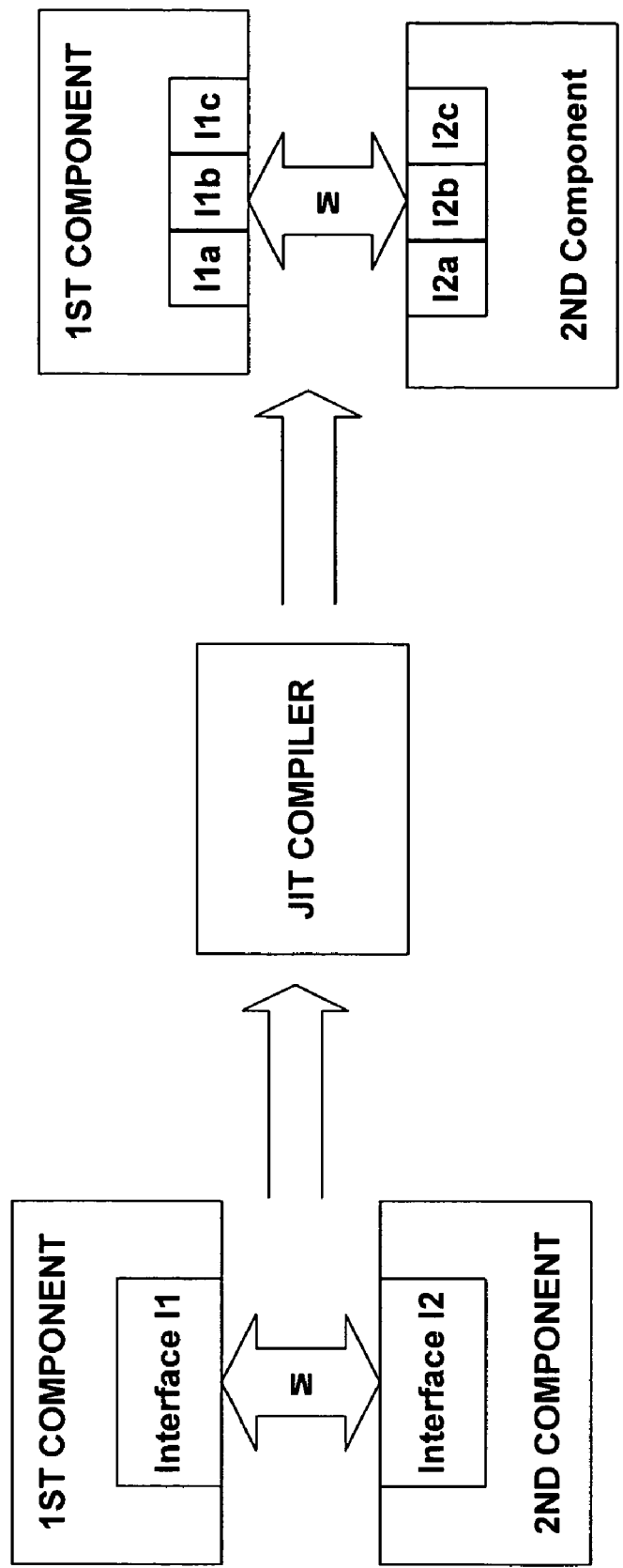
FIGURE F2

SYSTEMS AND METHODS FOR MANAGING PREPARATION OF GRAPHICAL ELEMENTS FOR PRESENTATION

FIELD OF THE INVENTION

This invention pertains generally to the fields of computer software development and operating systems, and, more particularly, to the management of the preparation of graphical elements for presentation.

BACKGROUND OF THE INVENTION

A central feature of modern computer operating systems is the ability to present and manage graphical items on an output device, such as a video monitor or printer. When a graphical item is created within an application, the item is sized and placed appropriately for rendering on the output device. Similarly, when an existing graphical item is modified or removed within an application, the output device must reflect this change appropriately. Existing computer operating systems make use of device drivers to communicate with particular output devices, thus sparing an application developer from the messy details of rendering graphical output on specific output devices. Existing computer operating systems accomplish this by publishing Application Programming Interfaces ("APIs") to prospective application developers.

Generally, an API is a set of high-level function calls made available to the application developer that are independent from the low-level instructions necessary for any particular device. The operating system, with the aid of device drivers, typically performs any needed translation of the high-level API calls to the low-level device-specific calls.

Nevertheless, although an application developer may not wish to concern himself with implementing how his application's graphical elements are physically displayed or rendered on any particular output devices, the developer may be interested in how those elements are logically laid out and managed. For example, an application developer may wish to develop a graphical user interface that displays its menus or arranges icons in a particular manner. Or a developer may wish to develop an application that arranges and displays multiple graphical elements in a single document in a particular fashion.

Existing software tools known in the art have given application developers some of these abilities. WINDOWS USER, for example, provided an API suited for controlling layout in a user interface scenario. MSHTML, on the other hand, provided an API suited for controlling layout in a document scenario. Trying to use either of these APIs in the other scenario, however, greatly increases the programming complexity while severely limiting performance. Furthermore, existing software tools are often too complex for developers who are not experienced with layout algorithms. Further still, existing software tools perform sub-optimally, such that updating a display layout requires significantly more time than necessary.

Accordingly, new methods and systems are needed to improve the ease with which developers can manage the layout of graphical elements in development environments. Further new methods and systems are needed to improve the performance and efficiency with which a computer application and operating system can manage the layout of graphical elements.

BRIEF SUMMARY OF THE INVENTION

In satisfaction of this need, embodiments of the present invention provide methods and systems for preparing graphical elements for presentation.

In accordance with one aspect of the invention, a method is provided for managing the preparation of a set of graphical elements for presentation. The method comprises identifying a first subset of the elements where measurement is desirable, identifying a second subset of the elements where arrangement is desirable, executing a first series of operations for measuring the elements comprising the first subset, and executing a second series of operations for arranging the elements comprising the second subset.

In some embodiments, each element in the first subset has associated with it a respective island of elements, and each element in the second subset has associated with it a respective island of elements. In some embodiments, identifying the first subset comprises using a first data structure to represent the first subset of the elements, and wherein identifying the second subset comprises using a second data structure to represent the second subset of the elements. In one version, the first and second data structures are queues.

In some embodiments, the first series of operations comprises identifying a maximal element represented in the first data structure, removing the maximal element's representation in the first data structure, measuring the maximal element, and repeating until the first data structure is empty.

In some embodiments, the second series of operations comprises identifying a maximal element represented in the second data structure, removing the maximal element's representation in the second data structure, arranging the maximal element, and repeating the until the second data structure is empty.

In some embodiments, measuring the maximal element comprises measuring an element from the island associated with the maximal element. In some embodiments, measuring the maximal element comprises determining whether an element from the island associated with the maximal element requires measuring.

In some embodiments, the first series of operations further comprises notifying a parent element of the maximal element that the measurements of the maximal element have changed. In some versions, in response to the notification, a representation of the parent element is placed in the first data structure.

In some embodiments, the number of elements represented in the first data structure cannot exceed a fixed maximum number. In some embodiments, the number of elements represented in the second data structure does not exceed a fixed maximum number.

In some embodiments, the first series of operations further comprises determining that an orphan element represented on the first data structure is not to be measured, and removing from the data structure the representation of the orphan element.

In accordance with another aspect of the invention, a system is provided for managing the preparation of a set of graphical elements for presentation. The system comprises a first data structure representing a first subset of the set of graphical elements requiring measurement, a second data structure representing a second subset of the set of graphical elements requiring arrangement, a first procedure using the first data structure for managing the measuring of elements, and a second procedure using the second data structure for managing the arranging of elements.

In some embodiments, the first procedure comprises the steps of identifying a maximal element represented in the first data structure, removing the maximal element's representation in the first data structure, measuring the maximal element, and repeating the until the first data structure is empty.

In some embodiments, the second procedure comprises the steps of identifying a maximal element represented in the second data structure, removing the maximal element's representation in the second data structure, arranging the maximal element, and repeating until the second data structure is empty.

In some embodiments, measuring the maximal element in the first procedure comprises determining whether an element from an island associated with the maximal element requires measuring, and measuring the element from the island associated with the maximal element if it requires measuring.

In some embodiments, the first procedure further comprises notifying a parent element of the maximal element that the measurements of the maximal element have changed.

In some embodiments, the first procedure further comprises determining that an orphan element represented on the first data structure is not to be measured, and removing from the first data structure the representation of the orphan element.

In accordance with still another aspect of the invention, a computer-readable medium including computer-executable instructions is provided for facilitating managing the preparation of graphical elements for presentation in a system. The computer-executable instructions execute the steps of identifying a first subset of the elements where measurement is desirable, identifying a second subset of the elements where arrangement is desirable, executing a first series of operations for measuring the elements comprising the first subset, and executing a second series of operations for arranging the elements comprising the second subset.

In some embodiments, each element in the first subset has associated with it a respective island of elements, and each element in the second subset has associated with it a respective island of elements.

In some embodiments, identifying the first subset comprises using a first data structure to represent the first subset of the elements, and wherein identifying the second subset comprises using a second data structure to represent the second subset of the elements. In some versions, the first and second data structures are queues.

In some embodiments, the first series of operations comprises identifying a maximal element represented in the first data structure, removing the maximal element's representation in the first data structure, measuring the maximal element, and repeating until the first data structure is empty.

In some embodiments, the second series of operations comprises identifying a maximal element represented in the second data structure, removing the maximal element's representation in the second data structure, arranging the maximal element, and repeating until the second data structure is empty.

In some embodiments, measuring the maximal element in the first series of operations comprises measuring an element from the island associated with the maximal element. In some versions, measuring the maximal element in the first series of operations comprises determining whether an element from the island associated with the maximal element requires measuring.

In some embodiments, the first series of operations further comprises notifying a parent element of the maximal element that the measurements of the maximal element have changed. In some embodiments, the first series of operations further comprises placing a representation of the parent element in the first data structure in response to the notification.

In some embodiments, the first series of operations further comprises determining that an orphan element represented on the first data structure is not to be measured, and removing from the data structure the representation of the orphan element.

BRIEF DESCRIPTION OF THE DRAWINGS

While the appended claims set forth the features of the present invention with particularity, the invention and its advantages are best understood from the following detailed description taken in conjunction with the accompanying drawings, of which:

Figure 1:
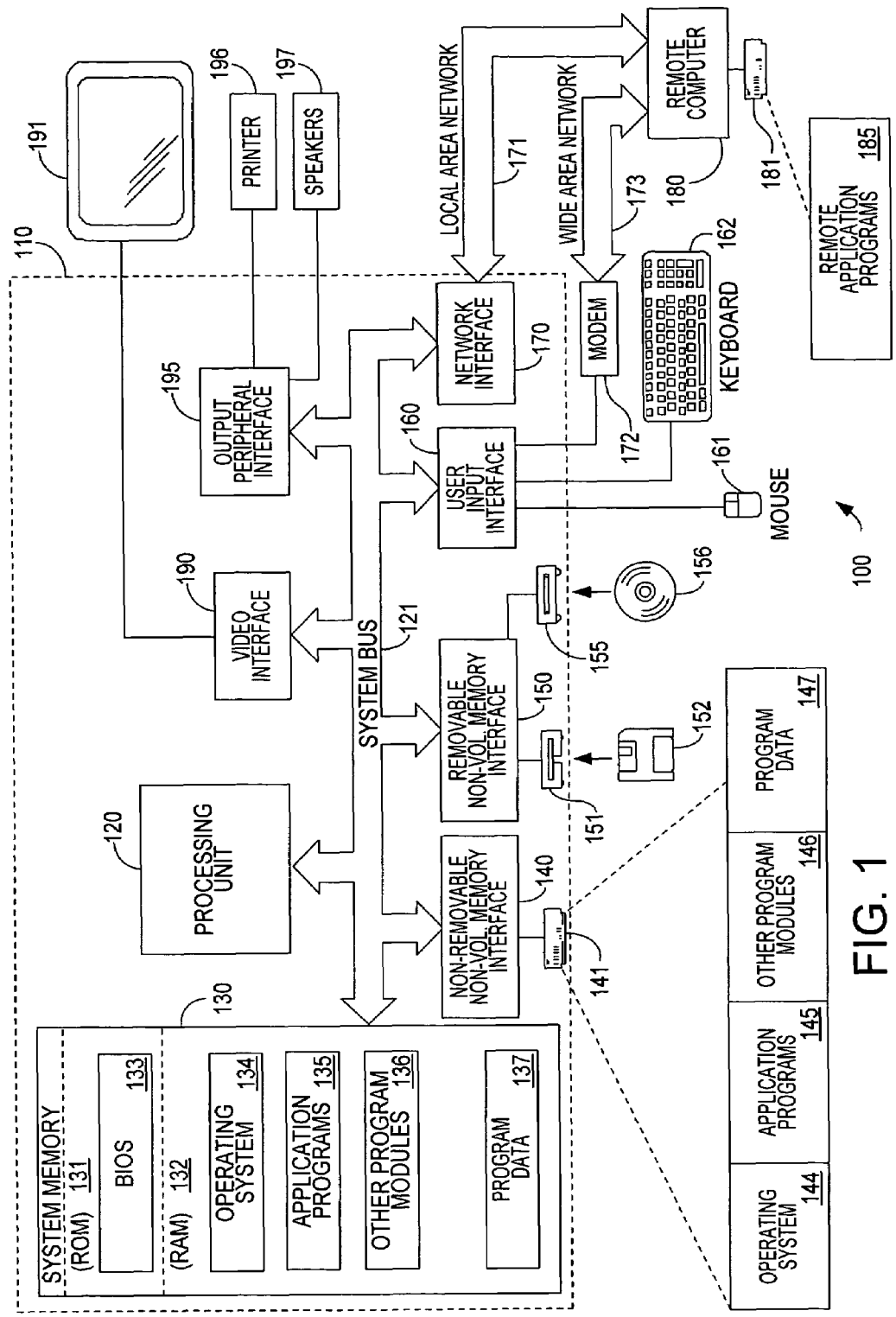
FIG. 1 is a simplified schematic illustrating an exemplary architecture of a computing device for carrying out preparation of a graphical element for presentation in accordance with an embodiment of the present invention.

FIGS. A1 and A2 illustrate a generic programming interface, in accordance with an embodiment of the invention.

FIGS. B1 and B2 illustrate the factoring of communications between code segments, in accordance with an embodiment of the invention.

FIGS. C1 and C2 illustrate redefinition of a programming interface, in accordance with an embodiment of the invention.

FIGS. D1 and D2 illustrate changing the form of a programming interface due to merger of functionality of code segments, in accordance with an embodiment of the invention.

FIGS. E1 and E2 illustrate breaking communication between code segments into multiple discrete communications, in accordance with an embodiment of the invention.

FIGS. F1 and F2 illustrate the dynamic rewriting of code, in accordance with an embodiment of the invention.

DETAILED DESCRIPTION OF THE INVENTION

The methods and systems to improve the ease with which developers can manage the layout of graphical elements in development environments and to improve the performance and efficiency with which a computer application and operating system can manage the layout of graphical elements will now be described with respect to preferred embodiments; however, the methods and systems of the present invention are not limited to software development tools and computer operating systems. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

The invention may be described in the general context of computer-executable instructions, such as procedures or program modules, being executed by a computer. Generally, program modules include procedures, routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
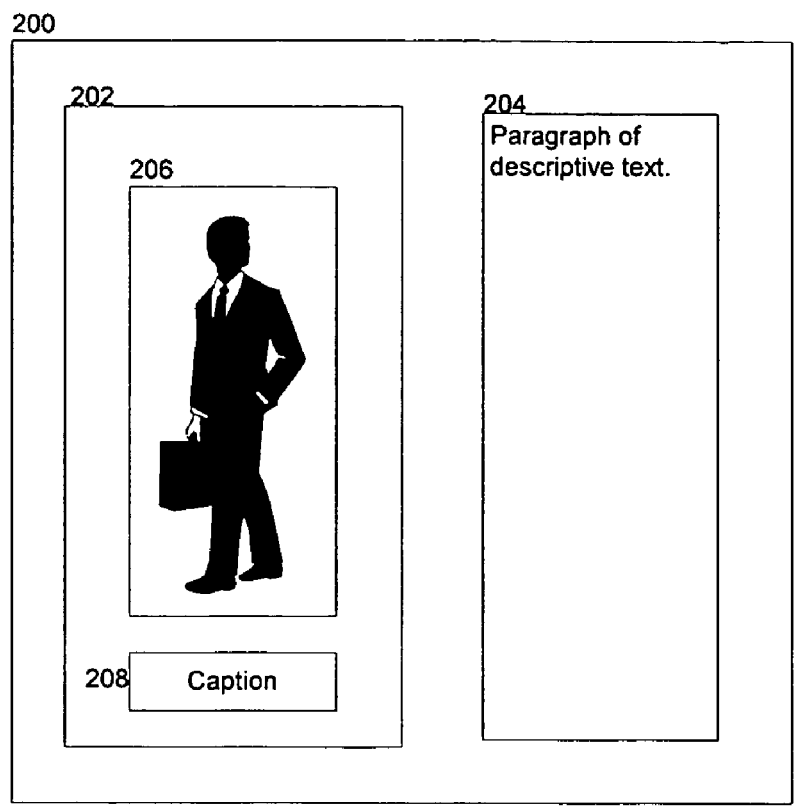
FIG. 2a is an example illustrating the presentation of a hierarchy of graphical elements.
Figure 2B:
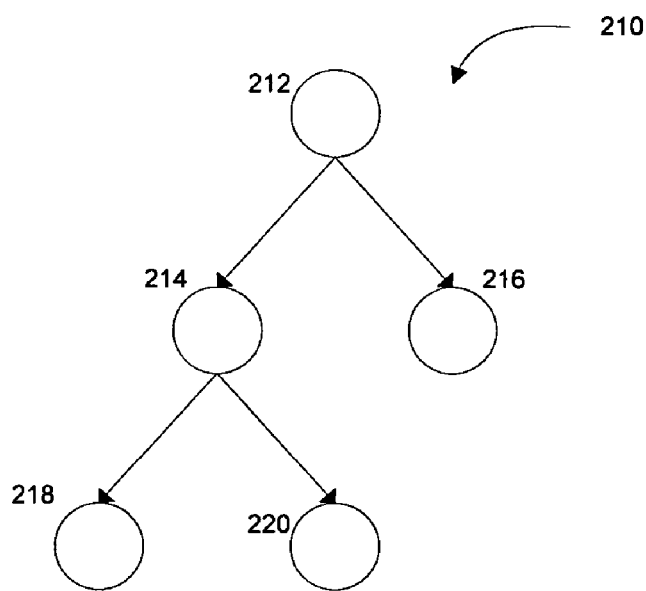
FIG. 2b is an example illustrating a hierarchical representation of graphical elements, in accordance with an embodiment of the invention.

The invention is well-suited for layout management systems that represent graphical elements in hierarchical form. An example of a hierarchical form is shown in FIGS. 2a and 2b. Element 200 contains two sub-elements 202 and 204. Sub-element 202 contains two sub-sub-elements 206 and 208. Sub-sub-element 206 is an image of a man with a brief-case. Sub-sub-element 208 is a text box containing a caption. Sub-element 204 is a text box containing descriptive text. The various elements are represented in hierarchical form in accordance with a tree 210. The root 212 of the tree 210 corresponds to the base element 200. Node 214 corresponds to sub-element 202. Node 216 corresponds to sub-element 204. Node 218 corresponds to sub-sub-element 206. Node 220 corresponds to sub-sub-element 208. An element is typically called the "parent" of its sub-element "child." If a parent element has more than one child element, the children are typically called "siblings."

Figure 3A:
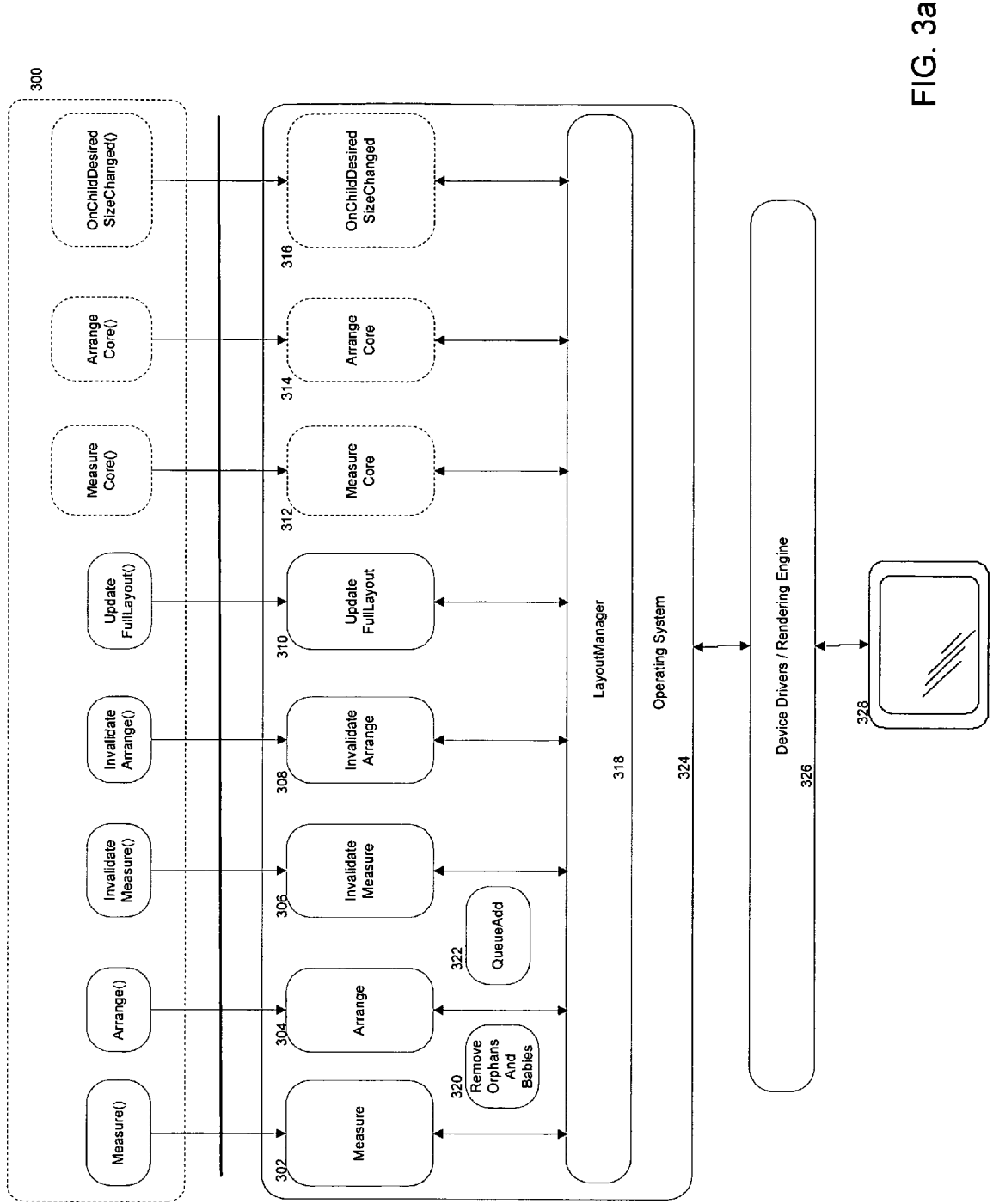
FIG. 3a is a simplified schematic drawing illustrating at a high level an exemplary architecture for managing the presentation of graphical elements, in accordance with an embodiment of the invention.

FIG. 3a illustrates at a high level an exemplary architecture for managing the presentation of graphical elements, as used in an embodiment of the invention. Various procedures are associated with a class of elements and made available to users through procedure handles 300. In one embodiment of the invention, the associated procedures include: a Measure procedure 302 for determining size parameters of an element; an Arrange procedure 304 for finalizing size and position coordinates of an element; an InvalidateMeasure procedure 306 for marking an element as requiring re-measurement; an InvalidateArrange procedure 308 for marking an element as requiring re-arrangement; an UpdateFullLayout procedure 310 for invoking the re-measurement or re-arrangement of all elements; a MeasureCore procedure 312 for aiding the Measure procedure 302; an ArrangeCore procedure 314 for aiding the Arrange procedure 304; and an OnChildDesiredSizeChanged procedure 316 for indicating to an element's parent that its desired size has changed. A LayoutManager program 318 interacts with the procedures described above in coordinating the entire presentation management process. Other procedures, such as a RemoveOrphansAndBabies procedure 320 and a QueueAdd procedure 322, are not directly accessible to a user, but are used to aid the LayoutManager 318 in performing presentation management functions. These procedures are described in greater detail, infra. The LayoutManager 318 and the various procedures reside within a computer operating system 324, such as those in the WINDOWS family of operating systems produced by the MICROSOFT CORPORATION of Redmond, Wash. The operating system 324 communicates with particular device drivers 326 to render the presentation of graphical elements for display on an output device 328 such as a monitor.

In one embodiment of the invention, the MeasureCore procedure 312 and the ArrangeCore procedure 314 are defined by a user of the invention and reside within a computer program application, whereas the other procedures are pre-defined and reside on the operating system 324, and are not changeable by a user. In one embodiment, the OnChildDesiredSizeChanged procedure 326 is pre-defined, but may be overridden by a user. That is, a default OnChildDesiredSizeChanged procedure 326 exists on the operating system 324, but a user is allowed to create a different OnChildDesiredSizeChanged procedure that resides in an application program. Similarly, one embodiment of the invention grants a user power to create alternative procedures that affect high-level functionality, but not low-level functionality, of presentation management. By keeping some procedures fixed while allowing others to be defined by a user, the system remains stable yet customizable.

Figure 3B:
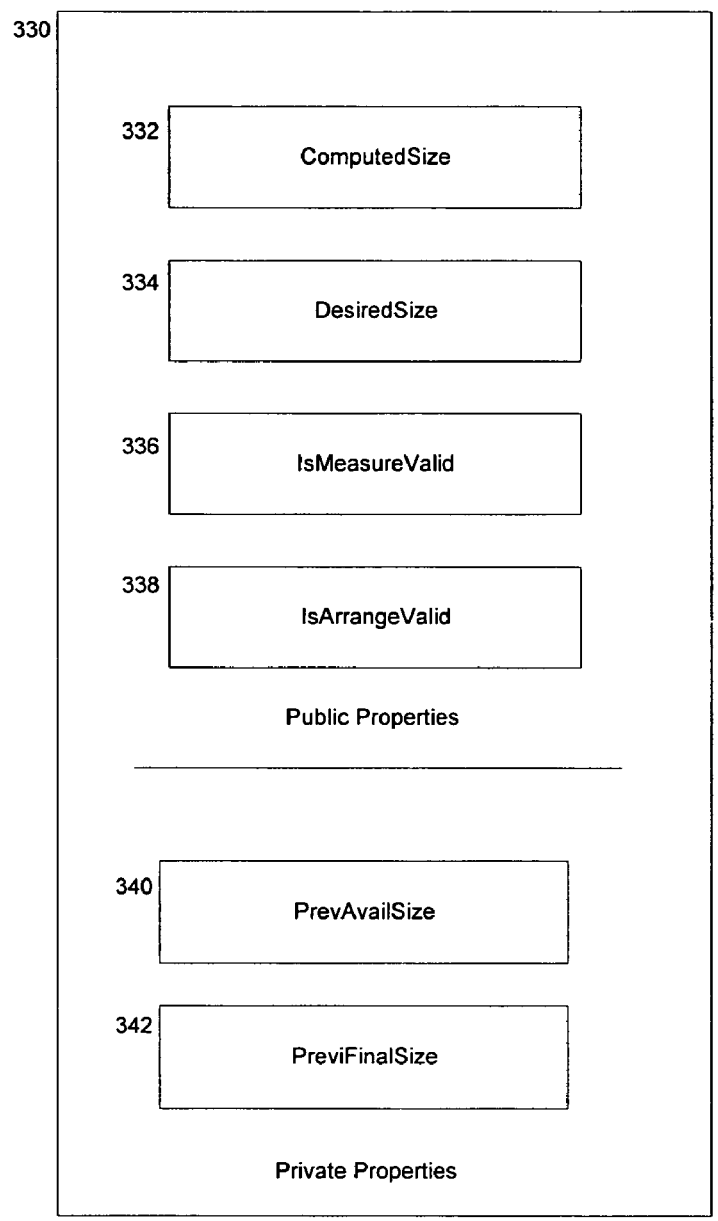
FIG. 3b is a diagram illustrating properties associated with a graphical element, in accordance with an embodiment of the invention.

FIG. 3b depicts properties associated with a class of elements, as used in an embodiment of the invention. In one embodiment, the class of elements comprises user interface elements, although the invention is not limited to elements of this particular genre. An element 330 stores information about its computed size in a ComputedSize property 332. An element's computed size represents a size at which it is determined that the element will be displayed on a display system. An element further stores information about its desired size in a DesiredSize property 334. An element's desired size may represent a size at which the element prefers to be displayed. An element also supports storing information indicating whether the element's measurement and display arrangement should be recalculated, in IsMeasureValid 336 and IsArrangeValid 338 properties, respectively. Additional properties that store information about the element are private, and not accessible to a user developer. Such private properties include a PrevAvailSize property 340 and a PrevFinalSize property 342. The PrevAvailSize 340 and PrevFinalSize 342 properties are used in conjunction with the Measure 302 and Arrange 304 procedures, and will be further described, infra.

An embodiment of the invention splits the display preparation process into two distinct phases: a measure phase and an arrange phase. In the measure phase, an element determines its DesiredSize. An element's DesiredSize is the size at which the element wishes to be displayed within available parameters. The available parameters are passed to the element from its parent. An element's DesiredSize is thus typically computed independently from the DesiredSize of its siblings. In the arrange phase, an element determines its ComputedSize. An element's ComputedSize is the size at which the element will be displayed. The ComputedSize is determined based on final size parameters passed to the element from its parent. The measure and arrange phases are controlled by a Layout Manager, which keeps track of elements needing arranging or measuring.

Figure 4:
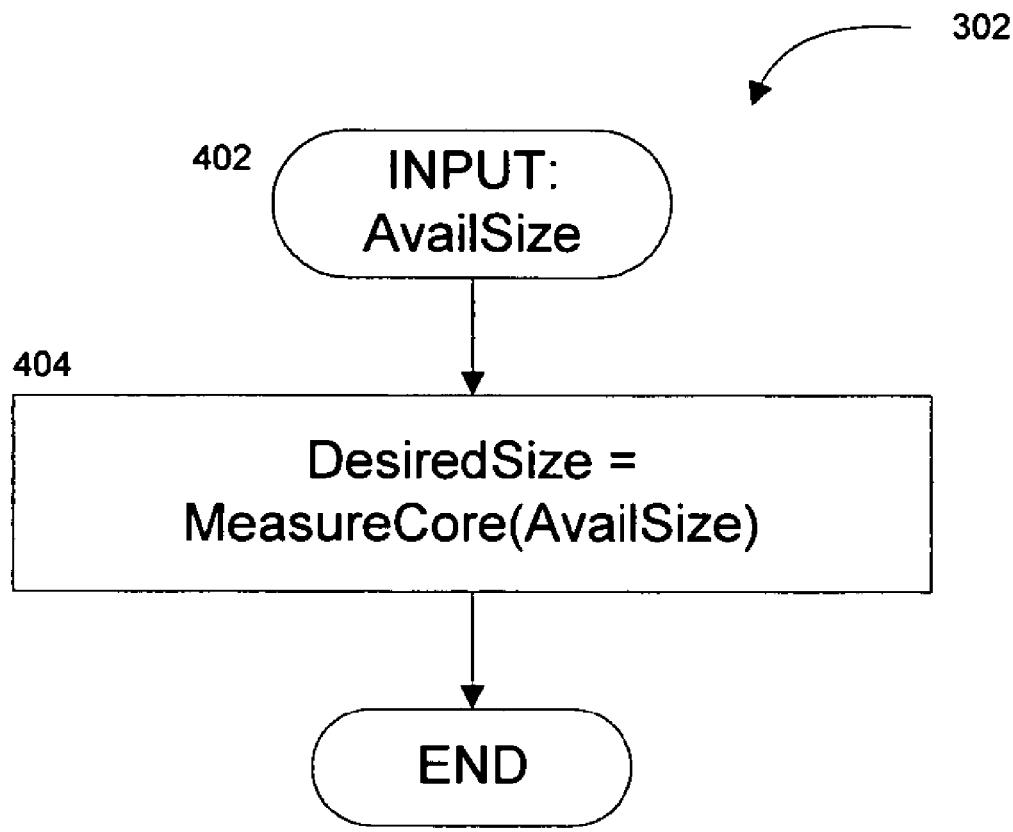
FIG. 4 is a flow diagram illustrating a simplified Measure procedure, in accordance with an embodiment of the invention.

Turning to particular procedures associated with an element in an embodiment of the invention, a general process for the Measure procedure 302 is shown in FIG. 4. The measure procedure 302 takes as its input an AvailSize parameter 402. A parent element typically invokes Measure on a child element, passing in an AvailSize value representing the maximum size the child may assume. AvailSize thus acts as an upper bound for the size of an element. Having received the AvailSize parameter 402, the Measure procedure 302, at step 404, computes the DesiredSize for the element. The DesiredSize is stored as a property on the element, and represents the size that the element should assume during the arrange phase, if possible. The DesiredSize is computed by passing the AvailSize parameter to a different procedure, MeasureCore (described herein below with reference to FIG. 5), which returns a size value.

Figure 5:
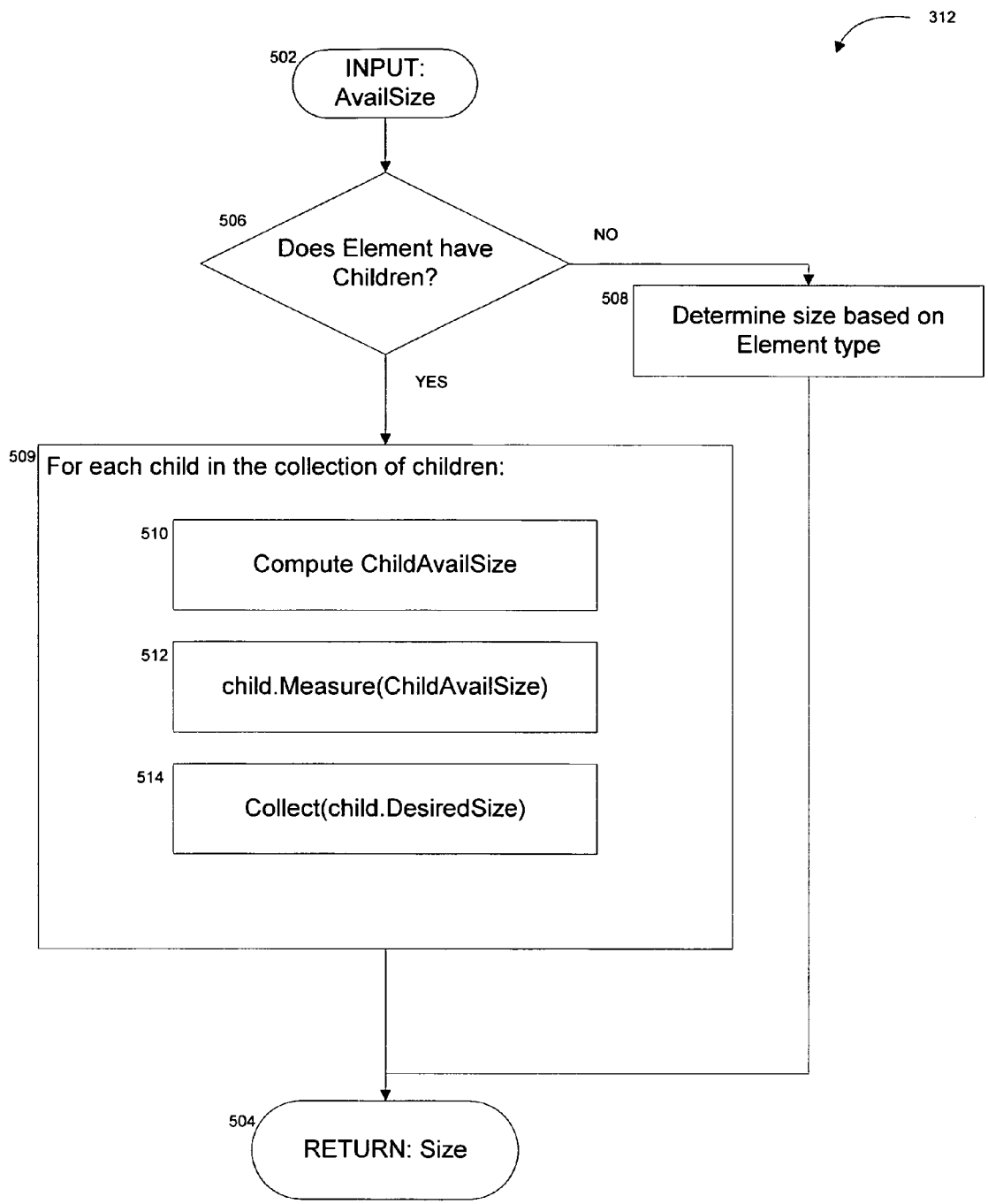
FIG. 5 is a flow diagram illustrating a MeasureCore procedure, in accordance with an embodiment of the invention.

A general description of the MeasureCore procedure 312, as used in an embodiment of the invention, is now described with reference to FIG. 5. It should be noted, however, that particular implementations of the MeasureCore procedure 312 are typically written by users to suit their particular layout management needs. Thus, although any MeasureCore procedure 312 will take an AvailSize parameter as input 502 and will return a size value as output 504, precisely how the size value is obtained may vary from implementation to implementation. Generally, however, MeasureCore takes AvailSize as input 502 from the element and then, at step 506, determines whether the element has any children. If the element has no children, then at step 508 MeasureCore determines a size for the element based on the element's type. For example, if the element is a JPEG image file, MeasureCore returns image size information taken from the JPEG file header; if the element comprises text, MeasureCore returns the total width of the text characters.

If the element does have children, their sizes are typically computed recursively at step 509. First, a child's available size, ChildAvailSize, is computed during step 510. The method for computing ChildAvailSize depends on the particular setting in which the invention is used, and the user writes the MeasureCore procedure accordingly. Once ChildAvailSize is computed, during step 512 it is passed into a Measure call for the child. As described previously, the Measure call results in a DesiredSize being stored on the child. At step 514, MeasureCore collects the child's DesiredSize and keeps it with the DesiredSizes of its other children. When all the children's DesiredSizes have been collected (upon completing step 514), MeasureCore computes a size for the element and returns this value as output to the procedure during step 504.

Figure 6:
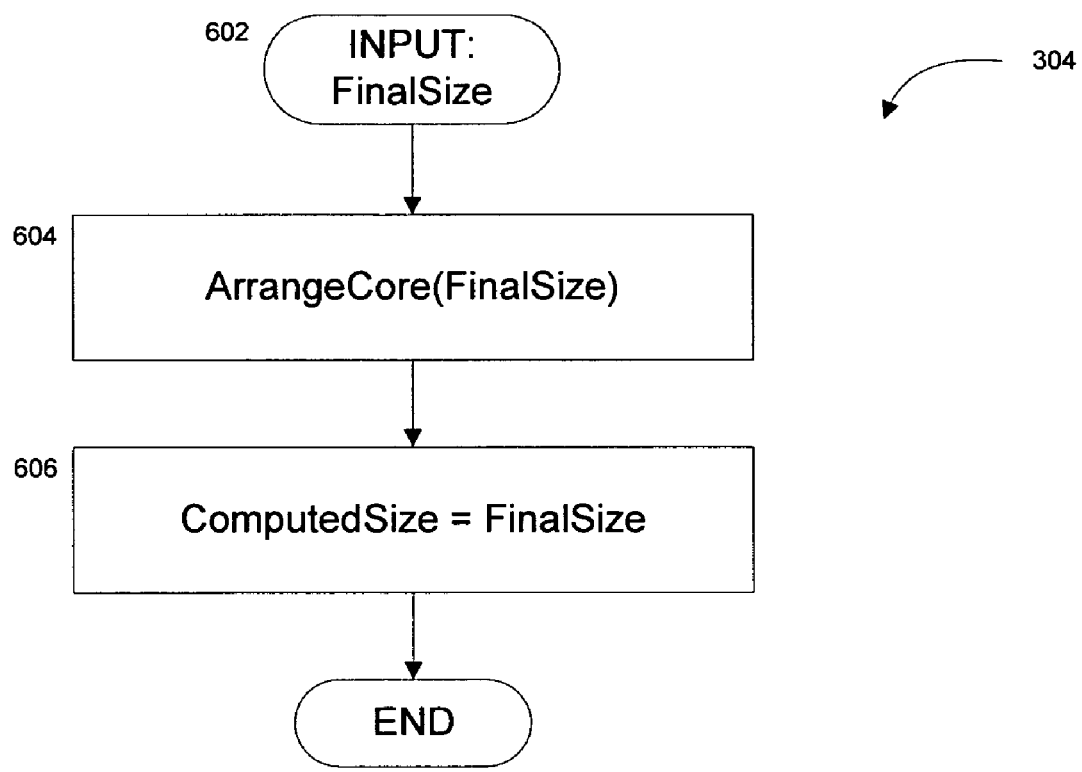
FIG. 6 is a flow diagram illustrating a simplified Arrange procedure, in accordance with an embodiment of the invention.

A general description of the Arrange procedure 304, as used in an embodiment of the invention, is now described with reference to FIG. 6. As previously noted, the Arrange procedure 304 is performed separately from the Measure procedure 302. Arrange 304 takes as its input a FinalSize parameter 602. A parent element typically invokes Arange 304 on a child element, passing in a FinalSize value representing the size the child will assume. A parent may, for example, pass in a value of FinalSize equal to the child's DesiredSize, thereby satisfying the child's wish. Alternatively, a parent may pass in a value of FinalSize equal to the available size the parent has set for the child, thereby ignoring the child's DesiredSize. Other approaches are possible. Having received the FinalSize parameter 602, at step 604 the Arrange procedure 304 invokes an ArrangeCore procedure 314, passing in the FinalSize as a parameter. At step 606 the Arrange procedure 304 also sets the element's ComputedSize to equal the FinalSize, and stores this ComputedSize value as a property on the element.

Figure 7:
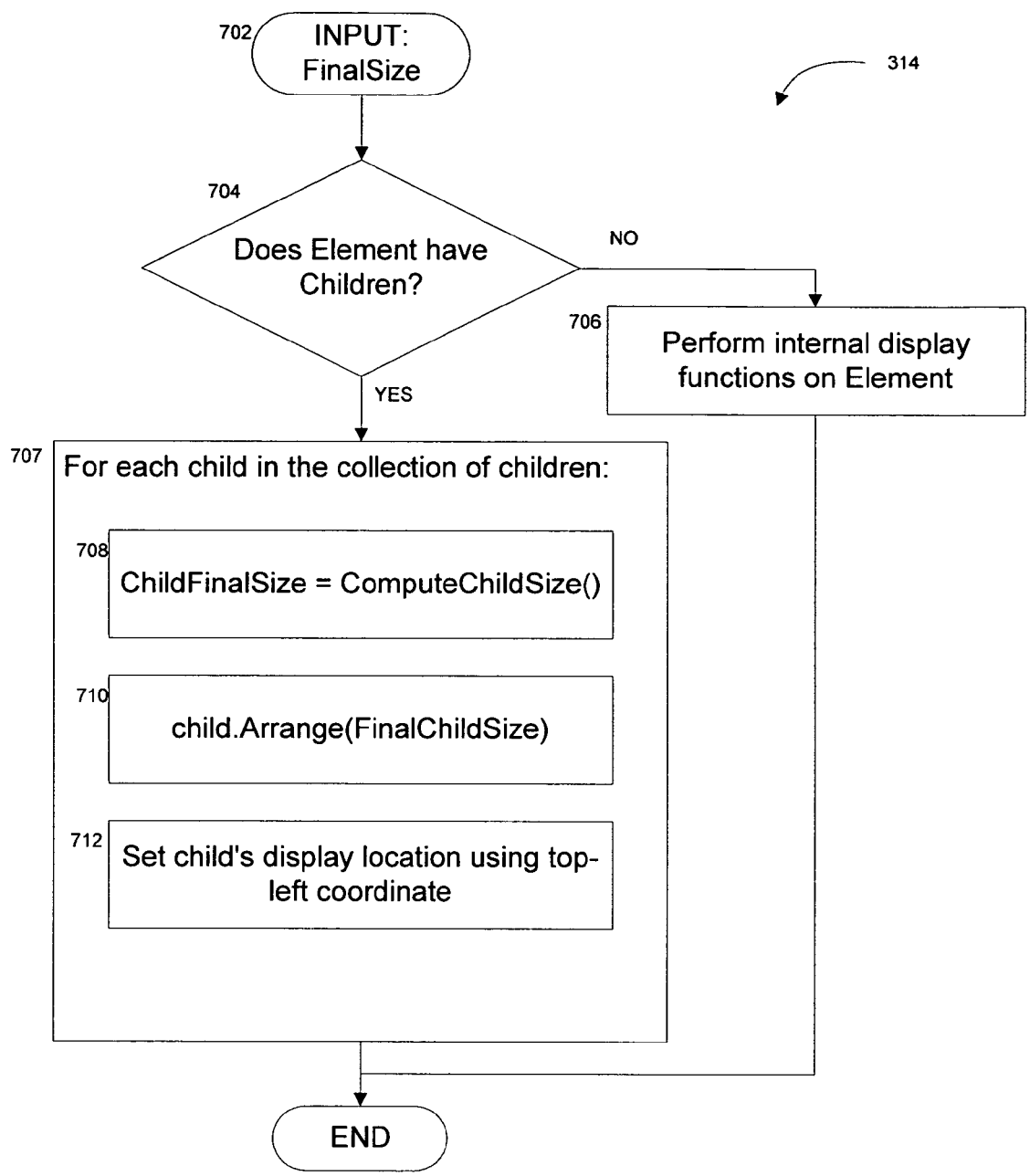
FIG. 7 is a flow diagram illustrating an ArrangeCore procedure, in accordance with an embodiment of the invention

The ArrangeCore procedure 314, as used in an embodiment of the invention, is now described with reference to FIG. 7. It should be noted, however, that particular implementations of the ArrangeCore procedure 314 are written to suit particular layout management needs. Thus, although any ArrangeCore procedure 314 will take a FinalSize parameter as input 702, precisely how the ArrangeCore procedure 314 operates potentially varies based upon the needs associated with any particular implementation. Generally, however, ArrangeCore 314 takes FinalSize as input 702 from an element and then at step 704 determines whether the element has any children. If the element has no children, then at step 706 the ArrangeCore procedure 314 performs internal arrangement functions on the element. These internal arrangement functions include, for example, font, alignment, color, or other operations affecting the appearance of the element.

If the element does have children, their final sizes are typically computed recursively at step 707 by executing a series of sub-steps. First, at sub-step 708 a child's final size, ChildFinalSize, is computed. The method for computing ChildFinalSize will depend on the particular setting in which the invention is used, and the user may write the ArrangeCore procedure 314 accordingly. Once ChildFinalSize is computed, during sub-step 710 it is passed into a Arrange call for the child. As described previously, the Arrange call results in a ComputedSize being stored on the child. ArrangeCore then takes the child's ComputedSize and uses it during step 712 to set the location at which the child element will be displayed. In one embodiment, the location is stored as the top-left coordinate of a rectangle representing the element. Other embodiments, which allow the element to be represented and displayed in different or arbitrary shapes, potentially use a different system or description to identify the display location of the element in relation to its parent view area.

The following XML example illustrates how the previously described procedures and properties are used to layout a control ("Dock") which sizes its children ("Label") to equal width, where the content of each child (a text string) is centered:

```
<Dock Width=300 EqualizeWidth=true>
    <Label Center=true Content="Text 1"/>
    <Label Center=true Content="Some long long long text (wraps)"/>
    <Label Center=true Content="NiceButton"/>
</Dock>
```

Figure 8A:
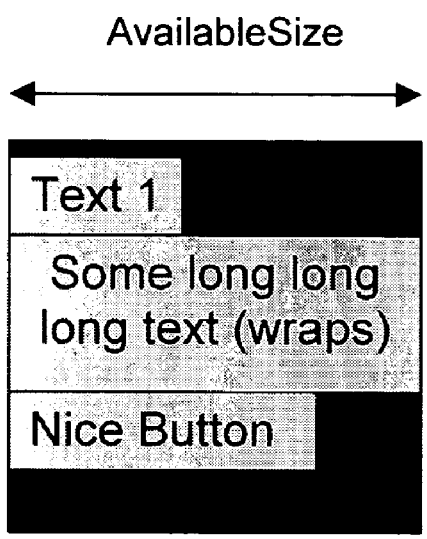
FIG. 8 is an example of a group of graphical elements being prepared for presentation, in accordance with an embodiment of the invention.

Assume the Measure call was issued with AvailSize=300, possibly because the width of the top level window was 300. Dock then calls Measure on each child with a AvailSize value of 300. This in turn recursively invokes MeasureCore on each child with an AvailSize of 300. Each Label returns DesiredSize, possibly using AvailSize as guidance for text wrapping. Note that when computing size, the Label's MeasureCore ignores the fact that the content needs to be centered. It ignores this information because the alignment does not affect the size of the control. The alignment affects only where the text within the Label is positioned, which can only be computed when the final width is known. Assume that the Labels return the following values from their MeasureCore calls: 153, 300 and 255. The Dock then decides that it needs to be 300 wide. The current state of the layout computation is illustrated in FIG. 8*a*.

Figure 8B:
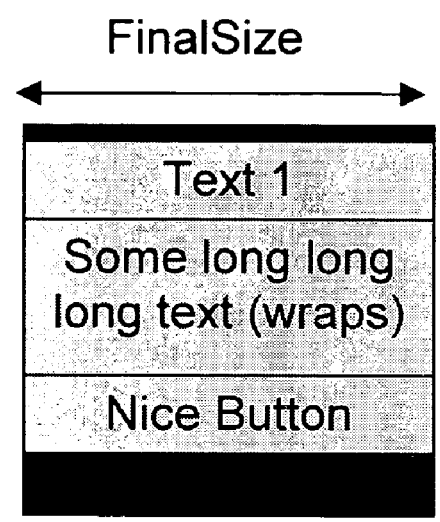

Continuing with the example, during an Arrange procedure, an ArrangeCore call comes into the Dock control. Suppose the FinalSize is 300, since the parent of the Dock control wants the Dock control to be exactly 300 pixels wide. Because the Dock control wants to size its children to equal width, it calls Arrange on each of the Labels with a FinalSize of 300. This in turn invokes the ArrangeCore method on each of the Labels with a FinalSize of 300. The Labels now do the work required for centering the text. The final layout is illustrated in FIG. 8*b*. The preceding example, of course, is purely illustrative, and reflects only one example situation, utilizing one embodiment of the invention.

Figure 9:
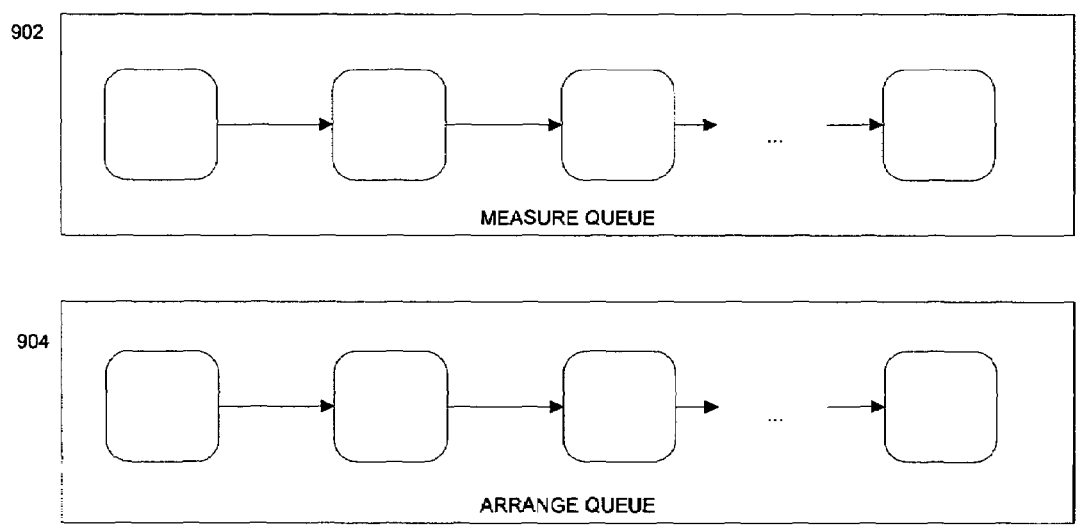
FIG. 9 is a diagram illustrating queues that are used in Measure and Arrange procedures, in accordance with an embodiment of the invention.

As previously mentioned, a Layout Manager 318 is responsible for controlling the measure and arrange phases in one embodiment of the invention. To facilitate such control, elements store two properties: IsMeasureValid 336 and IsArrangeValid 338. The IsMeasureValid 336 and IsArrangeValid 338 properties are typically Boolean variables, set to either TRUE or FALSE. The Layout Manager 318 identifies elements requiring measurement and invokes a Measure procedure on them. Similarly, the Layout Manager 318 identifies elements requiring arrangement, and can invoke an Arrange procedure on them. To this end, the Layout Manager 318 maintains two separate queues: a measure queue 902 and an arrange queue 904, as seen in FIG. 9. Alternatively, arrays, heaps, trees or other data structures are used. The measure and arrange queues contain lists of those elements requiring measurement and arrangement, respectively. However, as an optimization technique, the LayoutManager 318 maintains on the queues only a minimal number of elements that will ensure all elements requiring measurement and arrangement will receive it. For example, if a parent element and a child element both require measurement, only the parent element is stored on the queue, since invoking a Measure procedure on the parent will recursively invoke Measure on the child.

An element indicates its need to be measured by calling an InvalidateMeasure procedure 306. In one embodiment, the InvalidateMeasure procedure 306 sets the element's IsMeasureValid property to FALSE and determines whether to place the element on the measure queue of the Layout Manager. An InvalidateArrange procedure 308 works similarly by setting an element's IsArrangeValid property to FALSE and determining whether to place the element on the arrange queue of the Layout Manager 318. Typically, if an element requires measurement, it also requires arrangement. However, an element may require arrangement without requiring measurement.

Figure 10B:
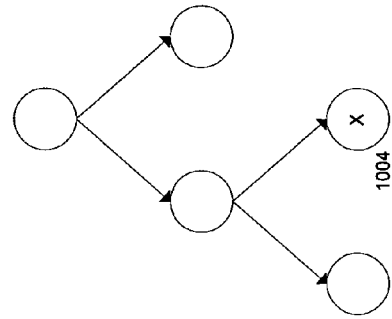
FIG. 10b is an example illustrating a hierarchical representation of graphical elements after an element's measurement has been invalidated, in accordance with an embodiment of the invention.
Figure 10B:
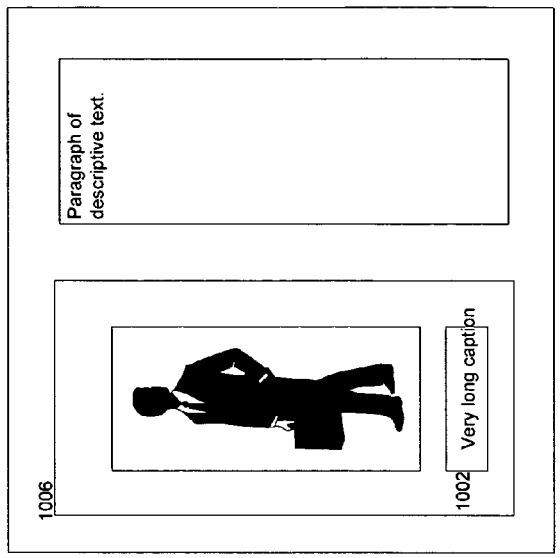
Figure 10A:
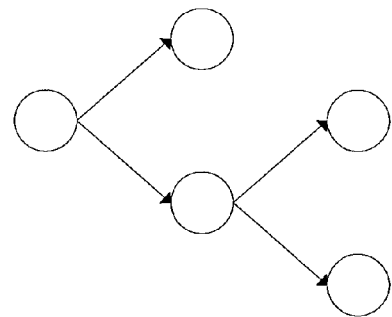
FIG. 10a is an example illustrating the presentation of a hierarchy of graphical elements.
Figure 10A:
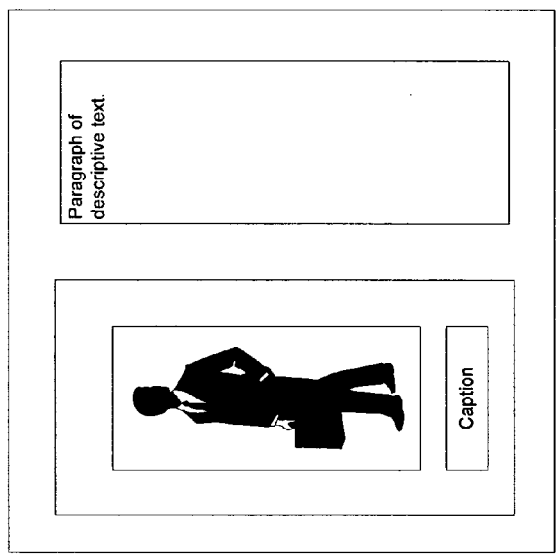

An example illustrating using the InvalidateMeasure procedure 306 is shown in FIGS. 10*a* and 10*b*. FIG. 10*a* shows a set of display elements validly measured and arranged, along with a corresponding tree representation of the elements. FIG. 10*b* shows the same set of elements after one element 1002 has been modified with some additional text. The additional text makes the resulting element exceed its given size. As a result, InvalidateMeasure is called on that element to indicate that the element needs to be measured again. InvalidateMeasure marks the element by setting its IsMeasureValid property to FALSE, as represented by the "X" in the element's tree node 1004. InvalidateMeasure determines whether to place the element on the Layout Manager's measure queue 902, and place it on the queue if necessary. Because an element requiring remeasurement will also require rearrangement, the IsArrangeValid property is also set to FALSE and the element is placed on the Layout Manager's arrange queue 904.

Additionally, if an element is remeasured and its DesiredSize changes, the element's parent is informed of the change, since the parent may now require remeasurement as well. For example, the additional text added to element 1002 results in its DesiredSize changing, but it may also result in the DesiredSize of its parent element 1006 changing. Thus an OnChildDesiredSizeChanged procedure 316 is available in one embodiment of the invention. The OnChildDesiredSizeChanged procedure 316 operates by calling InvalidateMeasure 306 on the parent element. This informs the Layout Manager that the parent element requires remeasurement, since its DesiredSize may have changed. In this way, measuring one element may cause other elements to need remeasurement.

Additionally, a single element with an invalid measure potentially causes its parent, grandparent, etc., to invalidate their measures as well. In one embodiment, an UpdateFullLayout procedure 310 is also provided. The UpdateFullLayout procedure 310 ensures that elements with invalid measurements are updated synchronously. The UpdateFullLayout procedure 310 operates by informing the LayoutManager 318 to remeasure the entire tree for the view.

Figure 11:
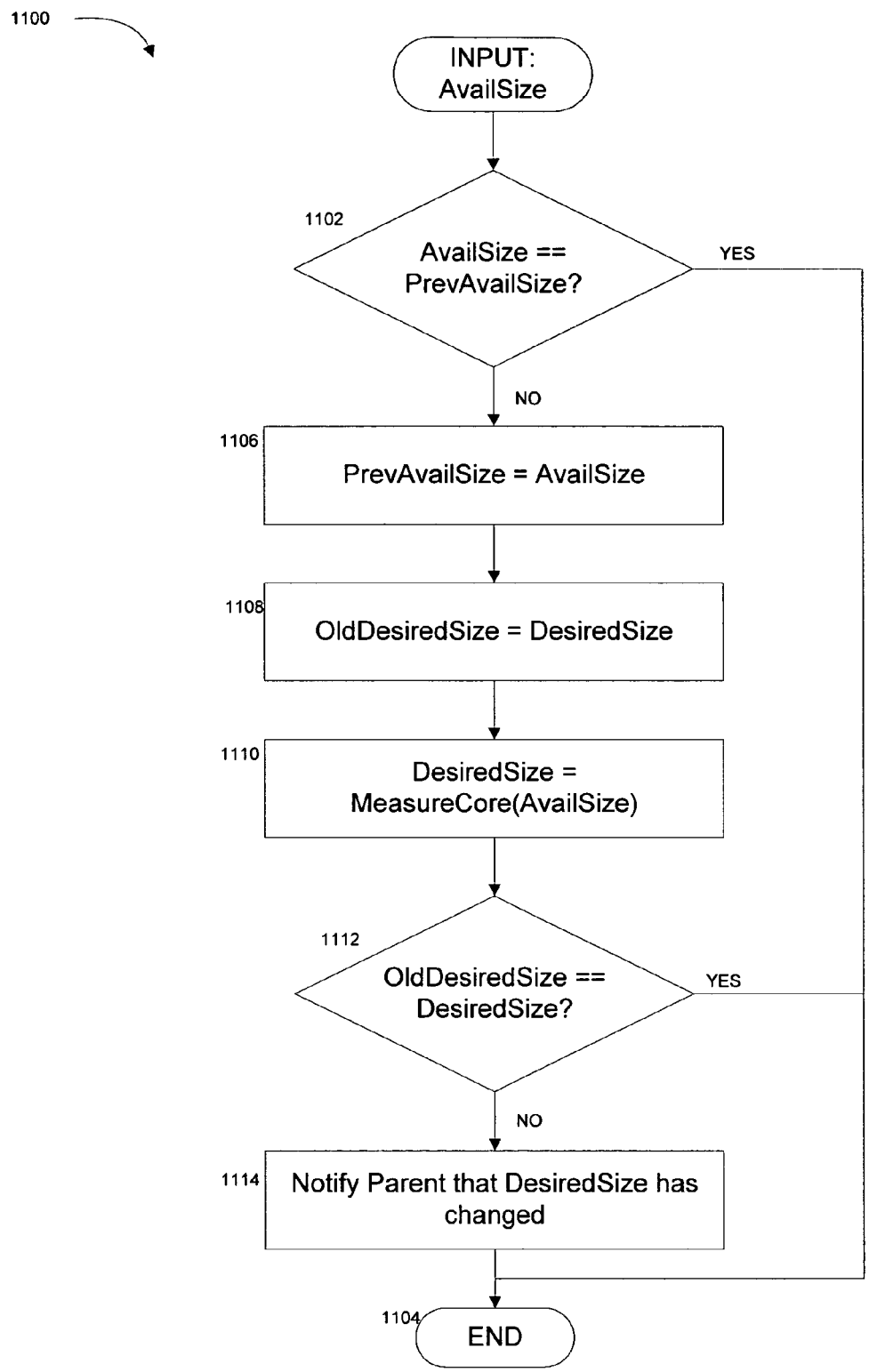
FIG. 11 is a flow diagram illustrating a Measure procedure, in accordance with an embodiment of the invention.

Further optimizations relating to illustrative embodiments of the invention are included in a more detailed version of the Measure procedure 1100, shown in FIG. 11. Such optimizations increase the efficiency of layout management, in accordance with an illustrative embodiment of the invention. The Measure procedure 1100, when called for an element, stores the input AvailSize in a PrevAvailSize cache 340 for that element to allow comparison to the AvailSize parameter passed in on the next time Measure 1100 is called on that element. When Measure 1100 is next invoked for that element, at step 1102 it checks if the current AvailSize has changed from the previous AvailSize. If there is no change in AvailSize, then there is no need to continue with the Measure/MeasureCore recursion down the tree, and the procedure therefore passes to the END 1104. Otherwise, Measure continues at step 1106 by storing the current AvailSize in the PrevAvailSize cache 340. At step 1108, Measure continues by temporarily storing in an OldDesiredSize variable the element's current DesiredSize. At step 1110 the Measure procedure 1100 sets DesiredSize as the returned value of a MeasureCore procedure. At step 1112 the Measure procedure compares the OldDesiredSize with the new DesiredSize. If there is no difference in value, then the DesiredSize has not changed, and the Measure procedure passes to the END 1104. Otherwise, at step 1114 the element notifies its parent that its DesiredSize has changed by calling the OnChildDesiredSizeChanged procedure.

The LayoutManager 318, as used in accordance with an embodiment of the invention, is now described. The LayoutManager 318 is a program typically residing on the operating system that manages the process of laying out graphical elements for rendering and presentation. The LayoutManager 318 is thus not typically accessible directly to a user or application developer. Rather, the LayoutManager 318 internally maintains lists of those elements requiring measurement and arranging due to invalidation. The LayoutManager 318 calls the Measure procedure 302 on elements requiring measurement, and calls the Arrange procedure 304 on elements requiring arrangement.

Figure 12:
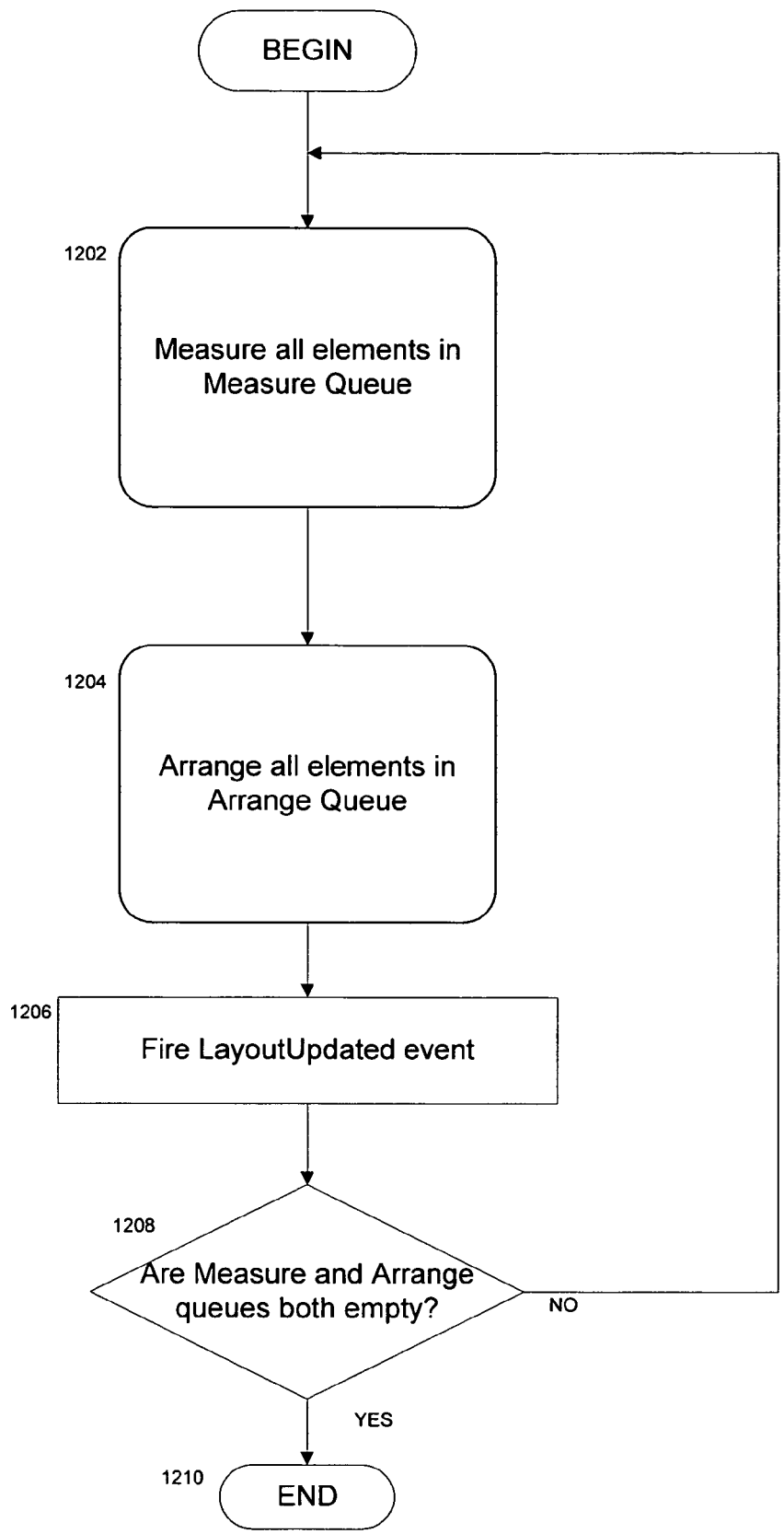
FIG. 12 is a flow diagram illustrating the functioning of a Layout Manager, in accordance with an embodiment of the invention.

FIG. 12 shows a sequence of steps generally performed by the LayoutManager 318, as used in one embodiment. LayoutManager 318 begins by passing through the measure queue 902 and, at step 1202, invoking the Measure procedure 302 for each element in the measure queue 902. Multiple passes through the measure queue may be necessary during step 1202 because the Measure procedure 302 invoked by the LayoutManager 318 may result in additional elements having their measures invalidated, and being placed on the measure queue 902. When the measure queue 902 is empty then the LayoutManager 318 continues with a pass through the arrange queue 904 during step 1204. At step 1204, the LayoutManager 318 passes through the arrange queue 904 and calls the Arrange procedure 304 on the elements. When the arrange queue 904 is empty the LayoutManager 318 continues at step 1206 by firing an UpdatedLayout event, which notifies any interested applications or processes that the layout has been updated. Interested applications or processes modify the layout of the graphical elements, which can invalidate measurements and arrangements of elements. LayoutManager 318 therefore checks that both the measure and arrange queues are still empty during step 1208. If either queue is not empty, the entire process begins again at step 1202. Otherwise, the LayoutManager 318 passes to the END 1210.

Figure 13:
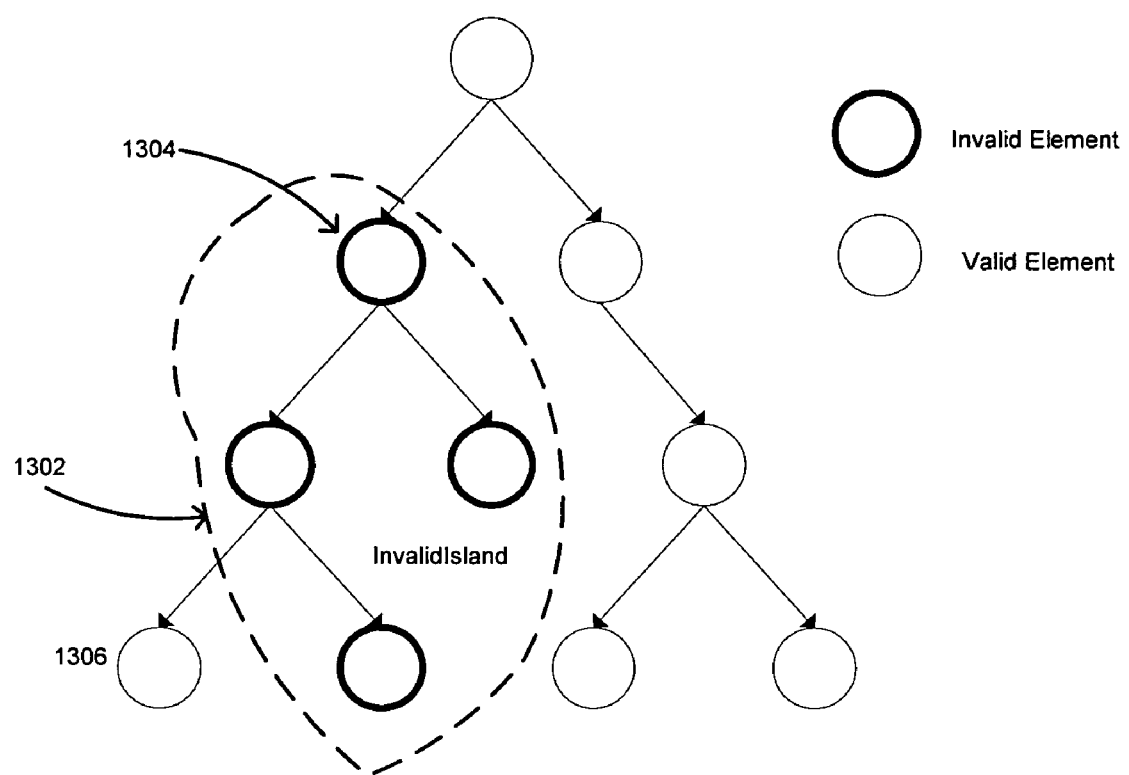
FIG. 13 is a diagram illustrating an Invalid Island, in accordance with an embodiment of the invention.

FIG. 13 illustrates an "InvalidIsland" which is associated with an illustrative implementation of the LayoutManager. An InvalidIsland 1302 is a maximal subtree of the element hierarchy such that all elements in the subtree have an invalid measurement (or arrangement). The highest element in the subtree is called the "root" 1304 of the InvalidIsland 1302. Because the Measure and Arrange procedures work recursively down the element hierarchy, the LayoutManager only maintains in its queues those elements that are roots of InvalidIslands. This minimizes the size of the queue operations and speeds up computation time. Although only the roots of InvalidIslands are represented in the measure and arrange queues, all invalid elements remain marked as such via their IsMeasureValid and IsArrangeValid properties.

The illustrative LayoutManager 318 incorporates a number of execution features to increase performance. In one embodiment, an implementation of LayoutManager allocates a "pocket" containing a fixed number of items for the individual measure and arrange queues. When an element is to be added to a queue, the LayoutManager 318 takes an item from the pocket if items are available, and allocates an item otherwise. When an element is removed from a queue, its item is returned to the pocket. If the pocket is sufficiently large, very few allocations are necessary after the LayoutManager 318 begins running, thereby increasing performance/

In one embodiment, the size of the measure 902 and arrange queues 904 is limited to a maximum of 153 elements, and the LayoutManager 318 checks that this limit is not reached. This limit ensures that queue operations can be performed speedily while allowing an ample number of InvalidIslands to coexist. In other embodiments, other values for the maximum number of queue elements are used.

The LayoutManager 318 further ensures that the queues are continuously modified so that only roots are represented in the queues. When an element is invalidated via an InvalidateMeasure 306 or InvalidateArrange 308 call, the LayoutManager 318 determines whether the element is included in a current InvalidIsland. If so, the root of the InvalidIsland is already present in the appropriate queue, and the newly invalidated element need not be directly represented in the queue. For example, if element 1306 is invalidated, it is included in the InvalidIsland 1302 and represented by its root 1304.

Alternatively, it is also possible that when an element is invalidated, it forms a new root, requiring the removal of older roots from the queue. For example, if element 1308 is invalidated, it becomes the new root of InvalidIsland 1302. The LayoutManager then adds this element 1308 to the queue and removes the old root 1304 from the queue.

Figure 14B:
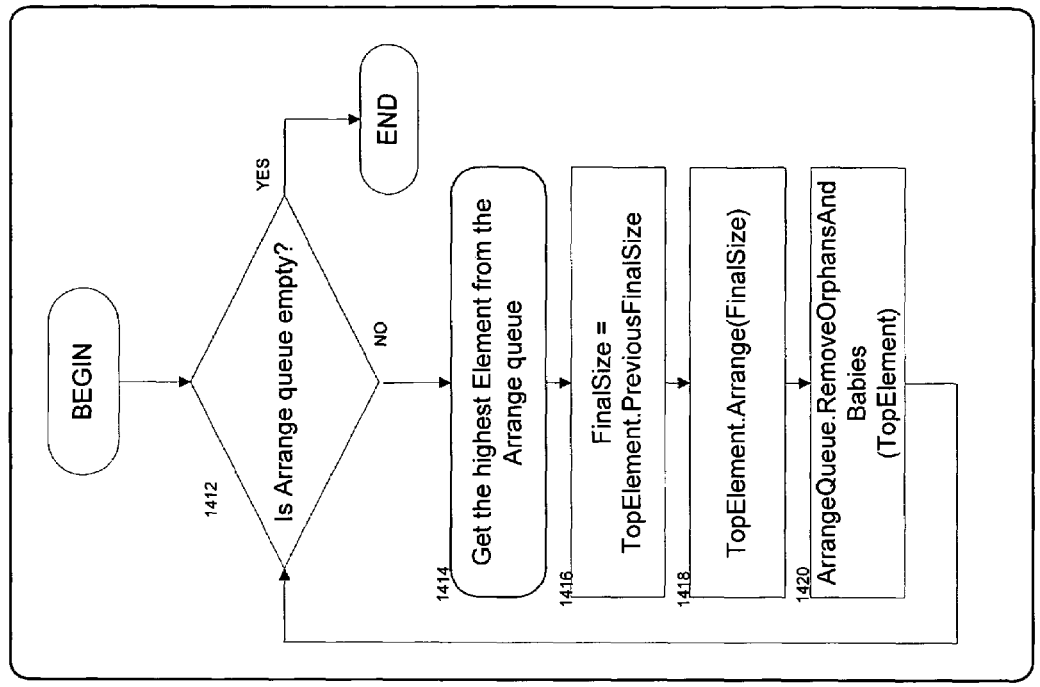
FIG. 14b is a flow diagram illustrating a Layout Manager passing through an arrange queue, in accordance with an embodiment of the invention.
Figure 14A:
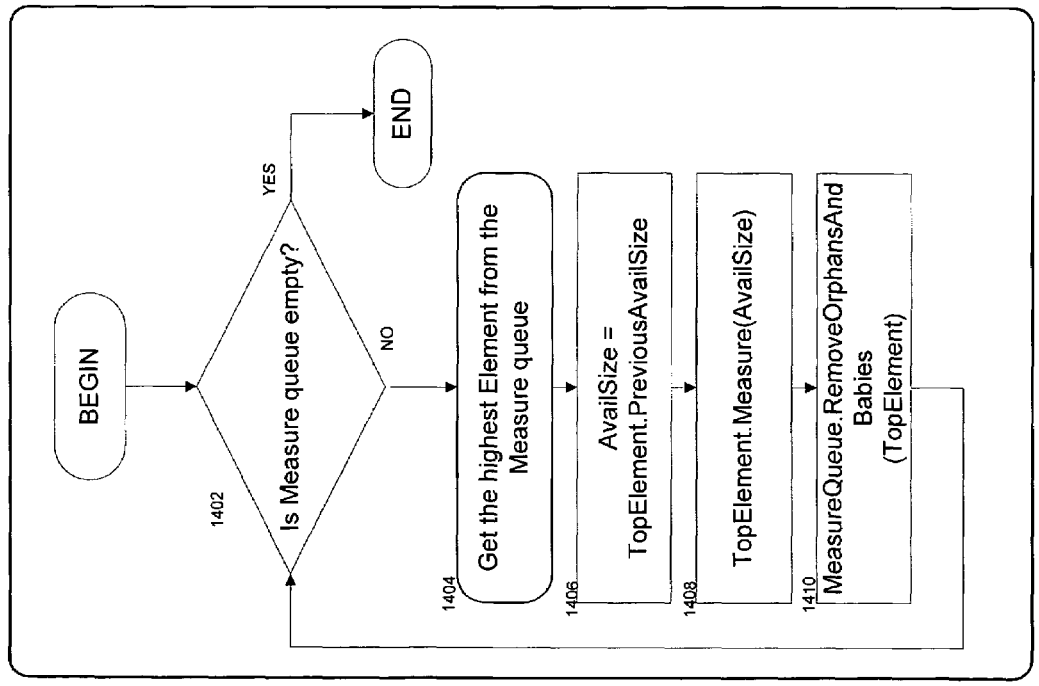
FIG. 14a is a flow diagram illustrating a Layout Manager passing through a measure queue, in accordance with an embodiment of the invention.

Turning to FIG. 14, the process by which the LayoutManager 318 passes through the queues and calls the Measure 302 and Arrange procedures 304 (as seen in steps 1202 and 1204) is now described in greater detail, as used in accordance with one embodiment of the invention. During step 1402 the LayoutManager first determines whether the measure queue 902 is empty. If the measure queue 902 is empty, the measure phase is complete and control passes to the END. If the queue 902 is not empty, then at step 1404 the LayoutManager compares the elements in the queue 902 and obtains the element that is highest in the tree, called TopElement. This is accomplished by sorting the queue elements, or by using any method that allows the maximum element to be found. Alternatively, in some embodiments the LayoutManager obtains the queue element that is lowest in the tree. The TopElement is removed from the measure queue 902. At step 1406 the LayoutManager sets an AvailSize parameter equal to the AvailSize that was passed in by TopElement's parent during the previous time TopElement was measured. In an embodiment of the invention, elements locally store the previous AvailSize value in a PrevAvailSize variable. At step 1408 the LayoutManager calls the Measure procedure 302 on TopElement using the AvailSize as a parameter.

At step 1410, the LayoutManager performs "orphan removal" on any descendents of the element that now appear on the measure queue. An embodiment of the invention accounts for the case when a parent is not interested in measuring or arranging its child. There are times when an application developer may wish that certain elements are not measured or arranged via a recursive call from their parents. When the root of an InvalidIsland is measured or arranged, such elements avoid the recursive measurement or arrangement and remain invalid. These elements are designated "orphans" and generally should not appear on the queue. The process of removing such elements from the queue is called "orphan removal." The LayoutManager 318 continues by determining whether the measure queue 902 is empty during step 1402 and repeating the process if necessary.

The LayoutManager then turns to the Arrange phase, illustrated in FIG. 14b. It first makes sure the arrange queue 904 is not empty during step 1412. If the arrange queue 904 is empty, the arrange phase is complete. If the queue is not empty, the LayoutManager 318 compares the elements in the queue and obtains the element that is highest in the tree, called TopElement during step 1414. This is accomplished by sorting the queue elements, or by using any method that allows the maximum element to be found. The TopElement is removed from the arrange queue 904. At step 1416 the LayoutManager 318 sets a FinalSize parameter equal to the FinalSize that was passed in by TopElement's parent during the previous time TopElement was arranged. In an embodiment of the invention, elements locally store the previous FinalSize value in a PrevFinalSize variable. LayoutManager calls the Arrange procedure 904 on TopElement using the FinalSize as a parameter during step 1418. The LayoutManager performs "orphan removal" on any children of TopElement that now appear on the arrange queue at step 1420. At step 1412 the LayoutManager continues by determining whether the arrange queue 904 is empty and repeating the process if necessary.

Figure 15:
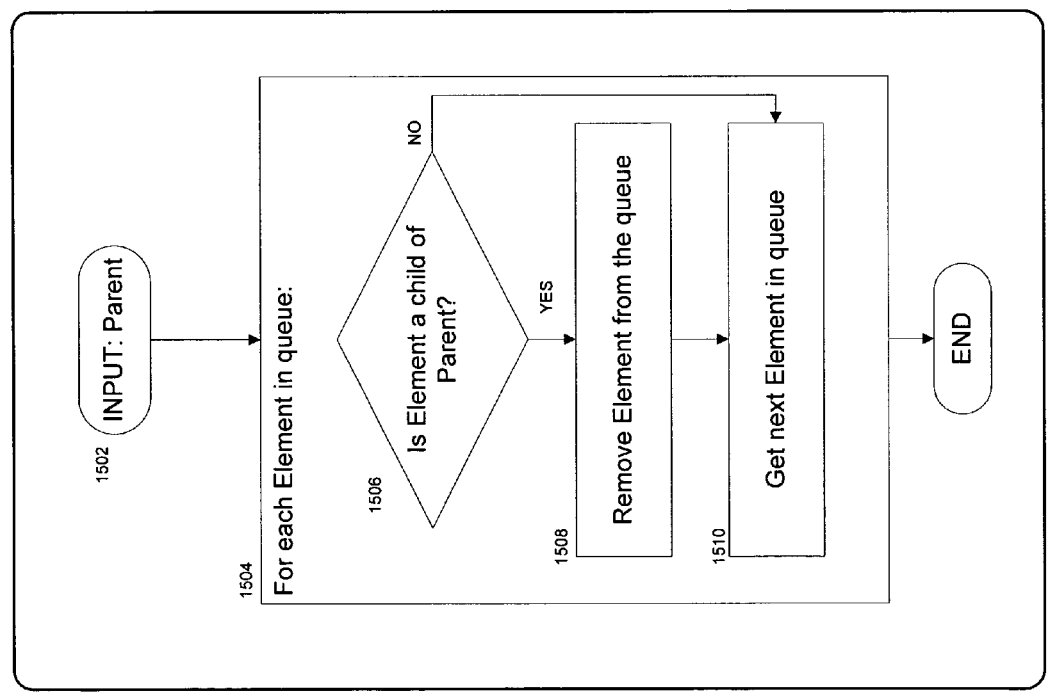
FIG. 15 is a flow diagram illustrating a RemoveOrphansAndBabies procedure, in accordance with an embodiment of the invention.

FIG. 15 shows the operation of a RemoveOrphansAndBabies procedure, as used in accordance with one embodiment of the invention. Orphans and babies are elements represented in the measure or arrange queue that should be removed from the queue for a number of reasons. First, if an element is being added to the queue and the element has a child already on the queue, then the child will be appear in the InvalidIsland rooted at the added element. The child is a baby and is no longer a root of an InvalidIsland; it should now be removed from the queue, helping minimize the number of queue elements. Second, if an element is being removed from the queue and the element has a child already on the queue, then the application developer presumably did not wish for the child to be measured or arranged in this particular situation—the parent had the opportunity to recursively measure or arrange the child but did not. The child is an orphan and should now be removed from the queue. The RemoveOrphansAndBabies procedure, as shown in FIG. 15, takes as input a Parent element during step 1502 and inspects each element of the queue during step 1504 to determine at step 1506 whether it is a child of Parent. If so, then the element is either an orphan or a baby and is removed from the queue during step 1508, and the next queue element is obtained in step 1510. If not, the element is not an orphan or baby and is not removed from the queue, but the next queue element is obtained in step 1510. In this manner, the RemoveOrphansAndBabies procedure ensures that no children of Parent remain on the queue.

Figure 16:
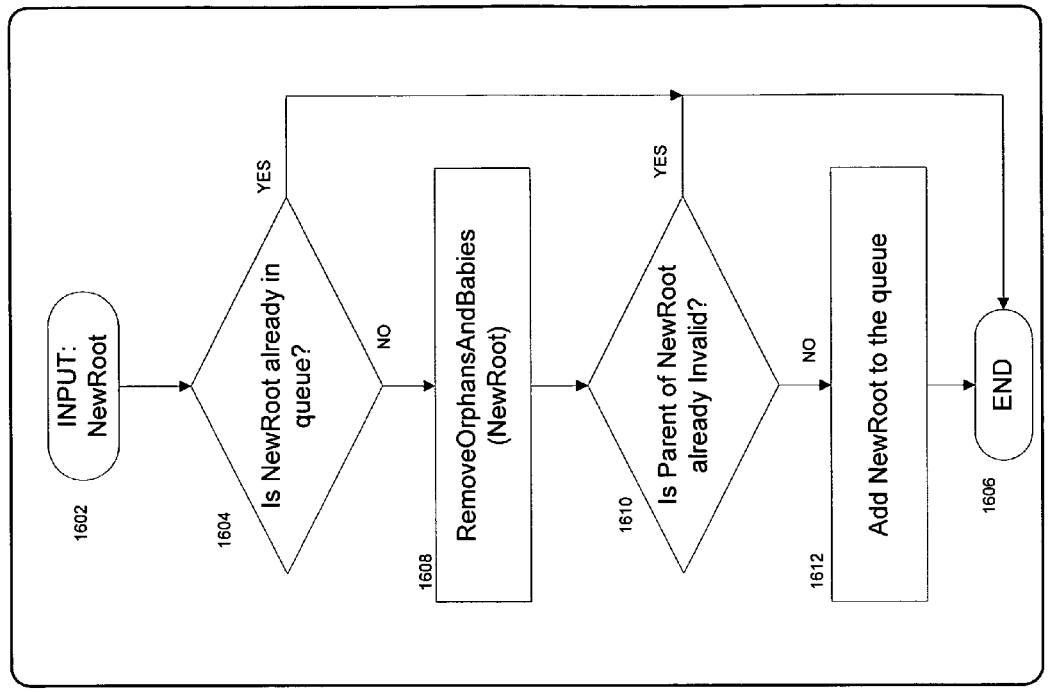
FIG. 16 is a flow diagram illustrating a QueueAdd procedure, in accordance with an embodiment of the invention.

FIG. 16 illustrates the QueueAdd procedure 322 for adding an element to the measure 902 or arrange queue 904, in accordance with one embodiment of the invention. The QueueAdd procedure 322 is called during the InvalidateMeasure 306 and InvalidateArrange 308 procedures, and is responsible for making sure roots of InvalidIslands are represented in the queues. The procedure takes as input a NewRoot at step 1602 and checks at step 1604 if the NewRoot is already in the queue. If so, the procedure ends at step 1606. If not, then a RemoveOrphansAndBabies procedure 320 is called at step 1608 to remove any children of NewRoot from the queue. QueueAdd 322 then checks if the parent of NewRoot is marked as invalid, by inspecting its IsMeasureValid or IsArrangeValid properties during step 1610. If the parent is already marked as invalid, then NewRoot is not added to the queue (it is subsumed in the parent's InvalidIsland), and the procedure ends at step 1606. Otherwise, NewRoot is added to the queue at step 1612.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Notionally, a programming interface may be viewed generically, as shown in FIG. A1 or FIG. A2. FIG. A1 illustrates an interface Interface1 as a conduit through which first and second code segments communicate. FIG. A2 illustrates an interface as comprising interface objects I1 and I2 (which may or may not be part of the first and second code segments), which enable first and second code segments of a system to communicate via medium M. In the view of FIG. A2, one may consider interface objects I1 and I2 as separate interfaces of the same system and one may also consider that objects I1 and I2 plus medium M comprise the interface. Although FIGS. A1 and A2 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. A1 and A2, but they nonetheless perform a similar function to accomplish the same overall result. We will now briefly describe some illustrative alternative implementations of a programming interface.

A. Factoring

A communication from one code segment to another may be accomplished indirectly by breaking the communication into multiple discrete communications. This is depicted schematically in FIGS. B1 and B2. As shown, some interfaces can be described in terms of divisible sets of functionality. Thus, the interface functionality of FIGS. A1 and A2 may be factored to achieve the same result, just as one may mathematically provide 24, or 2 times 2 time 3 times 2. Accordingly, as illustrated in FIG. B1, the function provided by interface Interface1 may be subdivided to convert the communications of the interface into multiple interfaces Interface1A, Interface 1B, Interface 1C, etc. while achieving the same result. As illustrated in FIG. B2, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. B1 and B2, the functional spirit of interfaces Interface1 and I1 remain the same as with FIGS. A1 and A2, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. C1 and C2. For example, assume interface Interface1 of FIG. A1 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. C1, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. C2, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. A1 and A2 may be converted to the functionality of FIGS. D1 and D2, respectively. In FIG. D1, the previous $1^{st}$ and $2^{nd}$ Code Segments of FIG. A1 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. D2, part (or all) of interface I2 from FIG. A2 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. A2 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. E1 and E2. As shown in FIG. E1, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. E2, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. A2 to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. F1 and F2. As can be seen in FIG. F1, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. F2, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. A1 and A2. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for managing the preparation of a set of graphical elements in a hierarchical structure for presentation, the method comprising:

identifying a first subset of the elements where measurement is desirable, wherein the measurement comprises measuring a root element and subsequently recursively measuring child elements of the root element, identifying at least one island within the first subset of elements, wherein each element in the first subset has associated with it a respective island of elements; wherein the at least one island includes the root element and at least one of the following: zero of the child elements or more than zero of the child elements;

adding the root element to a first data structure;

identifying a second subset of the elements where arrangement is desirable, wherein the arrangement comprises arranging a root element and subsequently recursively arranging child elements of the root element;

identifying at least one island within the second subset of elements, wherein each element in the second subset has associated with it a respective island of elements and wherein the at least one island includes the root element and at least one of the following: zero of the child elements or more than zero of the child elements;

adding the root element to a second data structure;

executing a first series of operations for measuring the elements comprising the first subset, wherein the first series of operations comprises:

a) identifying a maximal element represented in the first data structure, wherein the maximal element comprises the highest element in the first data structure, the first data structure comprising a hierarchical structure;

b) removing the maximal element's representation in the first data structure;

c) measuring the maximal element;

repeating the listed steps until the first data structure is empty; and executing a second series of operations for arranging the elements comprising the second subset;

issuing a notify message that the layout of the measured and arranged elements has been updated.

2. The method of claim 1 wherein the first and second data structures are queues.

3. The method of claim 1 wherein the second series of operations comprises:
   a) identifying a maximal element represented in the second data structure;
   b) removing the maximal element's representation in the second data structure;
   c) arranging the maximal element; and
   repeating the listed steps until the second data structure is empty.

4. The method of claim 1 wherein the first series of operations further comprises:
   d) notifying a parent element of the maximal element that the measurements of the maximal element have changed.

5. The method of claim 4 wherein, in response to the notification, a representation of the parent element is placed in the first data structure.

6. The method of claim 1 wherein the number of elements represented in the first data structure cannot exceed a fixed maximum number.

7. The method of claim 1 wherein the number of elements represented in the second data structure does not exceed a fixed maximum number.

8. The method of claim 1 wherein the first series of operations further comprises:
   d) determining that an orphan element represented on the first data structure is not to be measured; and
   e) removing from the data structure the representation of the orphan element.

9. A system for managing the preparation of a set of graphical elements in a hierarchical structure for presentation, the system comprising:
   a first subset of the set of graphical elements requiring measurement, wherein measurement comprises measuring a root element and subsequently recursively measuring child elements of the root element;
   a second subset of the set of graphical elements requiring arrangement, wherein arrangement comprises arranging a root element and subsequently recursively arranging child elements of the root element;
   using a first procedure for:
   a) identifying at least one island within the first subset of elements, wherein the at least one island includes the root element and at least one of the following: zero of the child elements or more than zero of the child elements;
   b) adding the root element to a first data structure;
   c) identifying a maximal element within the first data structure, wherein the maximal element comprises the highest element in the first data structure, the first data structure comprising a hierarchical structure;
   d) removing the maximal element's representation in the first data structure;
   e) measuring the maximal element;
   repeating the listed steps until the first data structure is empty; and
   using a second procedure for:
   a) identifying at least one island within the second subset of elements, wherein the at least one island includes the root element and at least one of the following: zero of the child elements or more than zero of the child of child elements; and
   b) adding the root element to a second data structure;
   issuing a notify message that the layout of the measured and arranged elements has been undated.

10. The system of claim 9 wherein the second procedure comprises the steps of:
    c) identifying a maximal element represented in the second data structure;
    d) removing the maximal element's representation in the second data structure;
    e) arranging the maximal element; and
    repeating the listed steps until the second data structure is empty.

11. The system of claim 9 wherein the first procedure further comprises:
    f) notifying a parent element of the maximal element that the measurements of the maximal element have changed.

12. The system of claim 9 wherein the first procedure further comprises:
    f) determining that an orphan element represented on the first data structure is not to be measured; and
    g) removing from the first data structure the representation of the orphan element.

13. A computer-readable medium including computer-executable instructions facilitating managing the preparation of graphical elements in a hierarchical structure for presentation in a system, the computer-executable instructions comprising:
    computer executable instructions for:
    identifying a first subset of the elements in a hierarchical structure where measurement is desirable, wherein measurement comprises measuring a root element and subsequently recursively measuring child elements of the root element;
    identifying at least one island within the first subset of elements, wherein each element in the first subset has associated with it a respective island of elements, and wherein the at least one island includes the root element and at least one of the following: zero of the child elements or more than zero of the child elements;
    adding the root element to a first data structure;
    identifying a second subset of the elements in a hierarchical structure where arrangement is desirable, wherein arrangement comprises arranging a root element and subsequently recursively arranging child elements of the root;
    identifying at least one island within the second subset of elements, wherein each element in the second subset has associated with it a respective island of elements; and wherein the at least one island includes the root element and at least one of the following: zero of the child elements or more than zero of the child elements;
    adding the root element to a second data structure;
    executing a first series of operations for measuring the elements comprising the first subset, wherein the first series of operations comprises:
    a) identifying a maximal element represented in the first data structure, wherein the maximal element comprises the highest element in the hierarchical structure;
    b) removing the maximal element's representation in the first data structure; and
    c) measuring the maximal element;
    repeating the listed steps until the first data structure is empty;
    executing a second series of operations for arranging the elements comprising the second subset, wherein the internal arrangement functions comprise computing a final size for a child element and utilizing the computed size to set a location for displaying the child element, wherein the location is stored as a coordinate of a geometric shape representing the child element; and issuing a notify message that the layout of the measured and arranged elements has been updated.

14. The computer-readable medium of claim 13 wherein the first and second data structures are queues.

15. The computer-readable medium of claim 13 wherein the second series of operations comprises:
   a) identifying a maximal element represented in the second data structure;
   b) removing the maximal element's representation in the second data structure;
   c) arranging the maximal element; and
   repeating the listed steps until the second data structure is empty.

16. The computer-readable medium of claim 13 wherein step c) in the first series of operations comprises measuring an element from the island associated with the maximal element.

17. The computer-readable medium of claim 13 wherein step c) in the first series of operations comprises:
   determining whether an element from the island associated with the maximal element requires measuring.

18. The computer-readable medium of claim 13 wherein the first series of operations further comprises:
   d) notifying a parent element of the maximal element that the measurements of the maximal element have changed.

19. The computer-readable medium of claim 18 wherein the first series of operations further comprises:

e) in response to the notification in step d), placing a representation of the parent element in the first data structure.

20. The computer-readable medium of claim 13 wherein the first series of operations further comprises:
   d) determining that an orphan element represented on the first data structure is not to be measured; and
   e) removing from the data structure the representation of the orphan element.

21. The method of claim 1 further comprising:
   determining if an element on the first data structure is a baby, wherein an element is a baby if it is a child of the root element being added to the first data structure; and
   removing the baby from the first data structure to minimize the number of elements in the first data structure.

22. The system of claim 9, further comprising:
   using the first procedure for determining if an element on the first data structure is a baby, wherein an element is a baby if it is a child of the root element being added to the first data structure; and
   using the first procedure for removing the baby from the first data structure to minimize the number of elements in the first data structure.

23. The computer-readable medium of claim 13, wherein the first series of operations further comprises:
   determining if an element on the first data structure is a baby, wherein an element is a baby if it is a child of the root element being added to the first data structure; and
   removing the baby from the first data structure to minimize the number of elements in the first data structure.

* * * * *